US007818079B2

(12) United States Patent
Väänänen et al.

(10) Patent No.: US 7,818,079 B2
(45) Date of Patent: Oct. 19, 2010

(54) EQUALIZATION BASED ON DIGITAL SIGNAL PROCESSING IN DOWNSAMPLED DOMAINS

(75) Inventors: Riitta Väänänen, Helsinki (FI); Jarmo Hiipakka, Espoo (FI)

(73) Assignee: Nokia Corporation, Espoo (FI)

( * ) Notice: Subject to any disclaimer, the term of this patent is extended or adjusted under 35 U.S.C. 154(b) by 1139 days.

(21) Appl. No.: 11/450,919

(22) Filed: Jun. 9, 2006

(65) Prior Publication Data

US 2007/0288235 A1 Dec. 13, 2007

(51) Int. Cl.
*G06F 17/00* (2006.01)

(52) U.S. Cl. ........................................................ 700/94

(58) Field of Classification Search .................. 700/94; 704/500–504

See application file for complete search history.

(56) References Cited

U.S. PATENT DOCUMENTS 5,892,833 A 4/1999 Maag et al.

7,519,538 B2 * 4/2009 Villemoes et al. ........... 704/501

OTHER PUBLICATIONS

Multi-Level IIR Digital Filters; R. Ansari; IEEE Transactions on Circuits and Systems, vol. CAS-33, No. 3, Mar. 1986.

"Tunable Digital Frequency Response Equalization Filters;" P. Regalia et al; IEEE Transactions on Acoustics, Speech and Signal Processing, vol. ASSP-35, No. 1, Jan. 1987.

* cited by examiner

*Primary Examiner*—Andrew C Flanders
(74) *Attorney, Agent, or Firm*—Alfred A. Fressola; Ware, Fressola, Van Der Sluys & Adolphson LLP

(57) ABSTRACT

This invention relates to a device, a method, a software application program, a software application program product and an audio device for processing a digital signal, wherein the digital signal is separated and downsampled into at least two downsampled subband signals, wherein at least one of the at least two downsampled subband signals is equalized, and wherein the at least two downsampled subband signals are upsampled and combined into a digital output signal.

69 Claims, 6 Drawing Sheets

EQUALIZATION BASED ON DIGITAL SIGNAL PROCESSING IN DOWNSAMPLED DOMAINS

FIELD OF THE INVENTION

This invention relates to a device, a method, a software application program, a software application program product and an audio device for processing a digital signal.

BACKGROUND OF THE INVENTION

Audio equalization means modifying the frequency balance of sound by attenuating or emphasizing the magnitude at certain frequencies. The motivation of this task is, e.g. enhancement of music listening experience, correction of the magnitude response of a sound output device (such as headphones or loudspeaker reproduction systems), or equalization of a room response. In music player and audio editing software, it is common to enable the listener to modify the frequency balance of a sound through a graphical user interface, denoted as a graphic equalizer.

A graphic audio equalizer (graphic audio EQ) enables visual and usually interactive way of frequency balance modification of audio in real time, and by means of digital signal processing. The available frequency region (e.g., from zero to Nyquist frequency) is divided to a certain number of bands whose magnitudes can interactively be modified. FIG. 1 depicts a target EQ magnitude response curve of an 8-band equalizer. The criteria according to which the EQ curve should be followed depend on implementation requirements. For example, in some cases it may be desirable to have as steep magnitude transitions as possible between adjacent bands. Usually, however, the target is to match the given magnitudes only at center frequencies of each band and have smooth magnitude changes between bands.

Typically, the EQ bands are distributed logarithmically (e.g., in octave or third octave bands) or in some other nonuniform manner in the frequency domain. Logarithmic distribution of bandwidths yields to narrow bands at low frequencies and wider bands at high frequencies. This type of EQ band distribution is well justified by the characteristics of human hearing, where the frequency resolution roughly follows the logarithmic scale.

A typical equalizer implementation includes cascaded peak and shelving filters, where the output magnitude response is calculated as a product of the magnitude responses of the cascaded filters. Another option is to connect the filters in parallel, in which case the resulting EQ magnitude response is the sum of the responses of the filters in the parallel connection. In the latter case, a problem may rise from different phase responses of the filters. In both cases, the gain adjustments of each band can be implemented by varying the parameters of only one filter.

There are different ways to implement a cascade of peak- and shelving filters. For example, in publication "Tunable Digital Frequency Response Equalization Filters" by P. A. Regalia and S. K. Mitra, IEEE Transactions on Acoustics, Speech, and Signal Processing, Vol. ASSP35, No. 1, January 1998, a solution is proposed where the output from an allpass filter is mixed with the direct signal. Concerning the above-mentioned parallel filtering it is disclosed in U.S. Pat. No. 5,892,833 that it is possible to achieve a low group delay as well as a good approximation to the target EQ magnitude response by adding together the outputs from a number of infinite impulse response (IIR) filters.

However, the above-mentioned solutions for equalization are not very suitable when the bandwidths of the subbands of the target EQ magnitude are very different, as in this case, the computational complexity of the filters increases, especially when FIR filters are applied for equalization. The usage of IIR filters, as proposed U.S. Pat. No. 5,892,833, would decrease said computational complexity, but, on the other hand, would introduce chirp-like audible artifacts caused by non-linear phase responses, and, furthermore, said IIR filters are extremely sensitive to noise and round-off errors.

SUMMARY OF THE INVENTION

In view of the above-mentioned problem, an improved device, method, software application program, software application program product and audio device are proposed.

It is proposed a device for processing a digital signal, said device comprising a separator and downsampler for separating and downsampling said digital signal into at least two downsampled subband signals; an equalizer for equalizing at least one of said at least two downsampled subband signals; and an upsampler and combiner for upsampling and combining said at least two downsampled subband signals into a digital output signal.

Said digital signal may have a sampling rate of $F_S$, and further, said digital signal may for instance be converted from an analog signal by an analog-to-digital converter. Furthermore, said digital signal may represent a digital audio signal, wherein said digital audio signal may be converted from an analog audio signal by an analog-to-digital converter.

Said separator and downsampler are applied to separate and downsample said digital signal into at least two downsampled subband signals, wherein the subbands corresponding to said downsampled subband signals may be separated from an arbitrary frequency band of said digital signal. Assuming said digital signal having a sampling rate $F_S$, said arbitrary frequency band may be defined within the available frequency region of said digital signal, wherein said available frequency region is defined from zero to Nyquist frequency $F_S/2$, so that said arbitrary frequency band may span a frequency range from $f_1$ to $f_2$ with $0 \leqq f_1 \leqq f_2 \leqq F_S/2$.

For example, said separator and downsampler separate and downsample said digital signal having a sampling rate $F_S$ into a set of 1 downsampled subband signals with $1 \geqq 2$, wherein the i-th (with $i \in \{1 \ldots i\}$) downsampled subband signal of said set of 1 downsampled subband signals has a sampling rate $F_{S,i}$ with $F_{S,i} < F_S$, and wherein the subband of said i-th downsampled subband signal corresponds to a frequency range from $f_{1,i}$ to $f_{2,i}$ of said digital signal with $f_1 \leqq f_{1,i} \leqq f_{2,i} \leqq f_2$. Furthermore, each of said sampling rates $F_{S,i}$ with $i \in \{1 \ldots i\}$ may correspond to the bandwidth of the associated i-th subband via $F_{S,i} = 2 \cdot (f_{2,i} - f_{1,i})$.

Said separator and downsampler may comprise filtering and decimation. For instance, said filtering and decimation may be arranged in the form of a filter bank, or, furthermore, said filtering and said decimation may be arranged in the form of a tree-structure. Furthermore, said separator and downsampler may be implemented by at least one quadrature mirror filter (QMF) analysis filter.

An equalizer for equalizing said at least one of said downsampled subband signals may comprise filtering in order to perform said equalizing, wherein said filtering may be represented by at least one FIR filter and/or at least one IIR filter. Said at least one FIR filter and/or said at least on IIR filter may operate with a sampling rate corresponding to the sampling rate of said at least one of said downsampled subband signals. Furthermore, at least one of said downsampled subband signals may be equalized by said filtering, wherein the transfer function of said filtering is adapted to a corresponding frequency band of an target equalizer transfer function, wherein said corresponding frequency band corresponds to the frequency range of said at least one of said downsampled subband signals. Said target equalizer transfer function may be a fixed transfer function, or may be an adaptive transfer function controlled by a signal processing algorithm, or said target equalizer transfer function may be interactively given by a user via an interface. Furthermore, said target equalizer transfer function may by represented by a target equalizer magnitude response.

Said downsampled and separated subband signals, wherein at least one of said downsampled and separated subband signals has been equalized by said equalizer, are upsampled and combined to a digital output signal by said upsampler and combiner. Said upsampler and combiner may comprise interpolation and filtering. For instance, said interpolation and said decimation may be arranged in form of a filter bank, or, furthermore, said interpolation and said filtering may be arranged in form of a tree-structure. Furthermore, said upsampler and combiner may be implemented by at least one quadrature mirror filter (QMF) synthesis filter.

According to the present invention, the computational complexity of said equalization means is reduced and smaller memory is required for the implementation, compared to an implementation where the signal processing is performed at the full sampling rate, because said equalizer operates on downsampled sampling rates in the corresponding subbands.

According to an embodiment of the present invention, said separator and downsampler for separating and downsampling said digital signal comprises at least one analysis filter.

Each of said at least one analysis filter may separate and downsample a first digital signal into at least two downsampled subband signals. Said analysis filter may be arranged in form of a filter bank which may be arranged in form of a tree structure. For instance, at least one of said at least one analysis filter is represented by a M-channel analysis filter bank with M>1.

According to an embodiment of the present invention, at least one of said at least one analysis filter is a quadrature mirror filter analysis filter.

Said quadrature mirror filter analysis filter may represent a 2-channel QMF analysis filter bank or an M-channel QMF analysis filter bank with M>2.

In case of representing a 2-channel QMF analysis filter bank, said quadrature mirror filter analysis filter may perform quadrature mirror filter analysis by separating and downsampling a first digital signal into a low-frequency downsampled subband signal and into a high-frequency downsampled subband signal, wherein said low-frequency downsampled subband signal and said high-frequency downsampled subband signal have the same bandwidth and the same sampling rate, wherein said sampling rate of said downsampled low-frequency subband signal and said downsampled high-frequency subband signal is half of the sampling rate of said first digital signal.

According to an embodiment of the present invention, said upsampler and combiner for upsampling and combining said digital signal comprises at least one synthesis filter.

Each of said at least one synthesis filter may upsample and combine at least two downsampled subband signals into a first digital output signal. Said synthesis filter may be arranged in form of a filter bank which may be arranged in form of a tree structure. For instance, at least one of said at least one synthesis filter is represented by a M-channel synthesis filter bank with M>1.

According to an embodiment of the present invention, at least one of said at least one synthesis filter is a quadrature mirror filter synthesis filter.

Said quadrature mirror filter synthesis filter may represent a 2-channel QMF analysis filter bank or an M-channel QMF synthesis filter bank with M>2.

In case of representing a 2-channel QMF analysis filter bank, said quadrature mirror filter synthesis filter may perform synthesis by upsampling and combining a low-frequency subband signal and a high-frequency subband signal into a first digital output signal, wherein said low-frequency subband signal and said high-frequency subband signal have the same bandwidth and the same sampling rate, and wherein said sampling rate is half of the sampling rate of said first digital output signal.

According to an embodiment of the present invention, said digital signal is a digital audio signal.

According to an embodiment of the present invention, said separator and downsampler comprises N analysis filters with N≧2, wherein said analysis filters are arranged in a non-symmetrical tree structure; and wherein said upsampler and combiner comprise N synthesis filters, wherein said synthesis filters are arranged in a non-symmetrical tree structure corresponding to said non-symmetrical tree structure of said N analysis filters.

Each of said N analysis filters may separate and downsample a first digital signal into a first set of at least two downsampled subband signals. Furthermore, each of said N synthesis filters may upsample and combine a corresponding set of at least two downsampled subband signals into a first digital output signal.

Said arrangement of said analysis filter in a non-symmetrical tree structure may be understood that at least one analysis filter of said N analysis filters separates and downsamples a first digital signal into a set of K downsampled subband signals with K≧2, wherein L downsampled subband signals of said K downsampled subband with 0<L<K are fed to an analysis filter separator and downsampler for separating and downsampling said L downsampled subband signals, and wherein at least one of the remaining K-L downsampled subband signals may be fed to said equalizer. Said non-symmetrical tree structure may be applied in order to downsample and separate said digital signal into at least three downsampled subband signals, wherein the subbands of said at least three downsampled subband signals may have narrow bands at low frequencies and wider bands at high frequencies. The arrangement of said analysis filter in a non-symmetrical tree structure may be understood as a single analysis filter bank, and the arrangement of said synthesis filter in a non-symmetrical tree structure may be understood as a single synthesis filter bank.

According to an embodiment of the present invention, at least one of said N analysis filters is a quadrature mirror filter analysis filter, and wherein at least one of said N synthesis filters is a quadrature mirror filter synthesis filter.

For instance, each of said N analysis filters is a quadrature mirror filter analysis filter, and each of said N synthesis filters is a quadrature mirror filter synthesis filter. Then, the arrangement of the quadrature mirror filter analysis filter in the non-symmetrical tree structure and the arrangement of the quadrature mirror filter synthesis filter in the corresponding non-symmetrical tree structure can be understood as tree-structured or nested quadrature mirror filter bank.

According to an embodiment of the present invention, said device comprises at least one delay module for delaying at least one of said at least two downsampled subband signals.

Said at least one delay module may be used for compensating for a delay mismatch between a first signal path and a second signal path in said device, wherein said delay module may comprise group delay module and/or at least one delay line. For instance, said delay mismatches may be caused by the signal processing of said equalizer, and/or by the signal processing of said separator and downsampler, and/or by the signal processing of said upsampler and combiner. For instance, assuming said equalizer comprises a filter, and wherein said filter comprises a first filter in a first signal path and a second filter in a second signal path, a delay mismatch may be caused by a different group delay of said first filter compared to the group delay of said second filter. In case that said filters are represented by symmetric, linear-phase FIR filters, the group delay of each filter is the same for all frequencies, thus said delay module may comprise a delay line in order to compensate for a delay mismatch between said first FIR filter and said second FIR filter.

According to an embodiment of the present invention, at least one of said at least one delay module comprises a group delay module.

For instance, assuming said equalizer comprises a filter, and wherein said filter comprises a first filter and a second filter, said group delay module may be used for compensating for group delay mismatches between said first filter and said second filter.

Furthermore, said group delay module may be used for compensating group delay mismatches caused by said separator and downsampler and caused by said upsampler and combiner.

Said group delay module may be represented by a filter, wherein said filter may be a first or higher order allpass filter, or any other kind of suitable filter for compensating for the group delay.

According to an embodiment of the present invention, a first of said N analysis filters comprises at least two outputs for outputting at least two digital signals, and wherein a first of said N synthesis filters comprises at least two inputs for inputting at least two digital signals, wherein said first synthesis filter corresponds to said first analysis filter via said non-symmetric tree structure; and wherein a first signal path begins at a first output of said at least two outputs of said first analysis filter, wherein said first signal path ends at a first input of said at least two inputs of said first synthesis filter, and wherein a second signal path begins at a second output of said at least two outputs of said first analysis filter, and wherein said second signal path ends at a second input of said at least two inputs of said first synthesis filter; and wherein said device comprises at least one delay module for delaying at least one of said at least two subband signals, wherein at least one of said at least one delay module comprises a group delay module, and wherein said group delay module is arranged for compensating for different group delays between said first signal path and said second signal path.

Said at least two outputs may correspond to said at least two downsampled subband signals associated with said first of said N analysis filters, and said at least two inputs may correspond to said at least two downsampled subband signals associated with said first of said N synthesis filters.

Said at least one of said at least one delay module may further comprise a delay line.

For instance, a downsampled subband signal associated with said first output and, thus, associated with said first signal path, may not be downsampled and not be separated before being fed to said first input, whereas a downsampled subband signal associated with said second output may be fed to a second analysis filter in order to downsample and separate said downsampled subband signal into a second set of at least two downsampled subband signals, wherein said second set of at least two downsampled subband signals is fed after being signal processed to a second synthesis filter corresponding to said second analysis filter, and wherein said second synthesis filter outputs a digital signal which is fed to said second input, wherein said outputted digital signal is associated with said second signal path. Thus, said second analysis filter and said second synthesis filter introduce a group delay to said second signal path, wherein said group delay may be compensated by the group delay module of said at least one of said at least one delay module, wherein said at least one of said at least one delay module delays said downsampled subband signal associated with said first output. Said at least one of said at least one delay module may be placed at any position within said first signal path.

In the case that at least one of said first signal path and at least one of said second signal path includes an equalizer, wherein said equalizer comprises symmetric linear-phase FIR filter, said at least one of said at least one delay module may further comprise a delay line in order to compensate for delay mismatches between said first path and said second path caused by said symmetric linear-phase FIR filter.

According to an embodiment of the present invention, at least one of said at least one analysis filter is a quadrature mirror filter analysis filter, and wherein at least one of said at least one synthesis filter is a quadrature mirror filter synthesis filter.

Said quadrature mirror filter analysis filter and said quadrature mirror filter synthesis filter introduces a group delay that varies as a function of frequency. Thus, said group delay module may be arranged for compensating for different group delays between said first signal path and said second signal path, wherein said different group delays may be caused by a different number of quadrature mirror filter analysis filter and quadrature mirror filter synthesis filter within said first signal path and said second signal path.

For instance, according to the example stated in the previous-mentioned embodiment, said second analysis filter may be represented by a quadrature mirror filter analysis filter, and said second synthesis filter may be represented by a quadrature mirror filter synthesis filter, said quadrature mirror filter analysis filter and said quadrature mirror filter synthesis filter introduce a group delay to said second signal path, wherein said group delay may be compensated by said group delay module of said at least one of said at least one delay module, wherein said at least one of said at least one delay module delays said downsampled subband signal associated with said first output.

According to an embodiment of the present invention, said equalizer comprises at least one finite impulse response (FIR) filter.

Each of said at least one FIR filter is applied for equalizing a corresponding downsampled subband signal of said at least two downsampled subband signals, wherein each of said at least one FIR filter may operate on the sampling rate of said corresponding downsampled subband signal. Thus, the computational complexity of said at least one FIR filter operating on a downsampled rate may be reduced compared to a FIR filter operating on the full sampling rate $F_S$, wherein $F_S$ denotes the sampling rate of said digital signal which is processed by said device.

Furthermore, each of said at least two downsampled subband signals may be equalized by a corresponding FIR filter.

According to an embodiment of the present invention, at least one of said at least one finite impulse response (FIR) filter is a symmetric, linear-phase FIR filter.

Said symmetric, linear-phase FIR filter has a group delay being the same for all frequencies. Thus, a group delay mismatch caused by said symmetric, linear-phase FIR filter may be compensated by a delay line. For instance, each of said at least two downsampled subband signals may be equalized by a corresponding symmetric, linear-phase FIR filter.

According to an embodiment of the present invention, at least one of said at least one quadrature mirror filter analysis filter comprises first or higher order allpass filters.

According to an embodiment of the present invention, at least one of said at least one quadrature mirror filter synthesis filter comprises first or higher order allpass filters.

According to an embodiment of the present invention, at least one of said at least one quadrature mirror filter analysis filter comprises a first allpass filter and a second allpass filter, and wherein said at least one of said at least one quadrature mirror filter analysis filter is associated with a sampling rate $F_S$, and wherein the magnitude response of a low-frequency branch of said at least one of said at least one QMF analysis filter has a stopband edge frequency $f_{st,L}$ relatively close to $F_S/4$, and wherein the magnitude response of a high-frequency branch of said at least one of said at least one QMF analysis filter has a stopband edge frequency $f_{st,H}$ relatively close to $F_S/4$.

For instance, said first allpass filter may represent a second order allpass filter, and, further, said second allpass filter may represent a second order allpass filter. Furthermore, said first allpass filter and said second allpass filter may represent polyphase components of $9^{th}$ order elliptic filters whose poles are on the imaginary axis.

According to an embodiment of the present invention at least one of said at least one quadrature mirror filter analysis filter comprises a first allpass filter and a second allpass filter, and wherein said at least one of said at least one quadrature mirror filter analysis filter is associated with a sampling rate $F_S$, and wherein the magnitude response of a low-frequency branch of said at least one of said at least one QMF analysis filter has a stopband edge frequency $f_{st,L} \approx 0.316 \cdot F_S$, and wherein the magnitude response of a high-frequency branch of said at least one of said at least one QMF analysis filter has a stopband edge frequency $f_{st,H} \approx 0.184 \cdot F_S$.

The design of the allpass filter coefficients gives the possibility to obtain increased stopband attenuation in the corresponding frequency branch. Typically the stopband edge frequencies, and the stopband attenuation have an interdependency, according to which it is possible in certain limits to obtain a greater attenuation in the stopband if the transition band left between $f_{st,L}$, and $f_{st,H}$ is allowed to increase. For example, designing second order allpass filter so that the example values of $f_{st,L} \approx 0.316 \cdot F_S$ and $f_{st,H} 0.184 \cdot F_S$ are obtained, it is possible to reach approximately 70 dB attenuation in the stopband, which in case of audio equalization reduces the risk of audible aliasing of frequencies, which would be caused by large variations in the levels of the target EQ magnitude response if the stopband attenuation was significantly smaller.

Furthermore, said first allpass filter and said second allpass filter may represent polyphase components of $9^{th}$ order elliptic filters whose poles are on the imaginary axis.

According to an embodiment of the present invention, at least one of said at least one quadrature mirror filter synthesis filter comprises a first allpass filter and a second allpass filter, and wherein said at least one of said at least one quadrature mirror filter synthesis filter is associated with a sampling rate $F_S$, and wherein the magnitude response of a low-frequency branch of said at least one of said at least one QMF synthesis filter has a stopband edge frequency $f_{st,L}$ relatively close to $F_S/4$, and wherein the magnitude response of a high-frequency branch of said at least one of said at least one QMF synthesis filter has a stopband edge frequency $f_{st,H}$ relatively close to $F_S/4$.

For instance, said first allpass filter may represent a second order allpass filter, and, further, said second allpass filter may represent a second order allpass filter. Furthermore, said first allpass filter and said second allpass filter may represent polyphase components of $9^{th}$ order elliptic filters whose poles are on the imaginary axis.

According to an embodiment of the present invention, at least one of said at least one quadrature mirror filter synthesis filter comprises a first allpass filter and a second allpass filter, and wherein said at least one of said at least one quadrature mirror filter synthesis filter is associated with a sampling rate $F_S$, and wherein the magnitude response of a low-frequency branch of said at least one of said at least one QMF synthesis filter has a stopband edge frequency $f_{st,L} \approx 0.316 \cdot F_S$, and wherein the magnitude response of a high-frequency branch of said at least one of said at least one QMF synthesis filter has a stopband edge frequency $f_{st,H} \approx 0.184 \approx F_S$.

The design of the allpass filter coefficients may be done for example so, that the stopband edge frequencies are $f_{st,L} \approx 0.316 \cdot F_S$ in said low-frequency branch and $f_{st,H} \approx 0.184 \cdot F_S$ in said high-frequency branch, and that the QMF synthesis will introduce −70 dB stopband attenuation in the corresponding frequency-branch of said at least of said at least one QMF synthesis filter which, in case of audio equalization, may reduce the risk of audible aliasing of frequencies that would be caused by large variations in the levels of a target EQ magnitude response and too small stopband attenuation. For instance, said first allpass filter may represent a second order allpass filter, and, further, said second allpass filter may represent a second order allpass filter. Furthermore, said first allpass filter and said second allpass filter may represent polyphase components of $9^{th}$ order elliptic filters whose poles are on the imaginary axis.

According to an embodiment of the present invention, said separator and downsampler said digital signal comprises at least one analysis filter, and wherein said upsampler and combiner for upsampling and combining said digital signal comprises at least one synthesis filter; and wherein at least one of said at least one analysis filter is a quadrature mirror filter analysis filter; and wherein at least one of said at least one synthesis filter is an quadrature mirror filter synthesis filter; and wherein at least one of said at least one quadrature mirror filter analysis filter comprises a first second order allpass filter and a second second order allpass filter, wherein said first second order allpass filter has a first transfer function $a_0(z)$ and said second second order allpass filter has a second transfer function $a_1(z)$, and wherein at least one of said at least one quadrature mirror filter synthesis filter comprises a third second order allpass filter and a fourth second order allpass filter, wherein said third second order allpass filter has said first transfer function $a_0(z)$ and said fourth second order allpass filter has said second transfer function $a_a(z)$, wherein said first second order allpass filter, said second second order allpass filter, said third second order allpass filter and said fourth second order allpass filter are polyphase components of $9^{th}$ order elliptic filters whose poles are on the imaginary axis.

Said first transfer function $a_0(z)$ may have the form $$a_0(z) = \frac{\alpha_{01} + \alpha_{02}z^{-1} + 1z^{-2}}{1 + \alpha_{02}z^{-1} + \alpha_{01}z^{-2}},$$

and said second transfer function $a_1(z)$ may have the form $$a_1(z) = \frac{\alpha_{11} + \alpha_{12}z^{-1} + 1z^{-2}}{1 + \alpha_{12}z^{-1} + \alpha_{11}z^{-2}}.$$

According to an embodiment of the present invention, at least one of said at least one quadrature mirror filter analysis filter comprises a first second order allpass filter and a second second order allpass filter, wherein said first second order allpass filter has a first transfer function $a_0(z)$ and said second second order allpass filter has a second transfer function $a_1(z)$, and wherein at least one of said at least one quadrature mirror filter synthesis filter comprises a third second order allpass filter and a fourth second order allpass filter, wherein said third second order allpass filter has said first transfer function $a_0(z)$ and said fourth second order allpass filter has said second transfer function $a_1(z)$, wherein said first second order allpass filter, said second second order allpass filter, said third second order allpass filter and said fourth second order allpass filter are polyphase components of $9^{th}$ order elliptic filters whose poles are on the imaginary axis, and wherein said at least one of said at least one quadrature mirror filter analysis filter corresponds to said at least one of said at least one quadrature mirror filter synthesis filter via said non-symmetric tree structure; and wherein at least one of said at least one group delay module has the following transfer function:

$$T(z) = \frac{z^{-1}a_0(z^2)a_1(z^2)}{2}$$

At least one of said at least one of said at least one quadrature mirror filter (QMF) analysis filter and at least one of said at least one of said at least one quadrature mirror filter (QMF) synthesis filter may be placed in said second signal path, wherein at least one of said at least one group delay is placed in said first signal path in order to compensate for the group delay introduced by said at least one of said at least one of said at least one QMF analysis filter and by said at least one of said at least one of said at least one QMF synthesis filter. For instance, a first group delay having said transfer function T(z) may be placed in said first signal path in order to compensate a group delay introduced by a first QMF analysis filter and by a first QMF synthesis filter of said at least one of said at least one QMF analysis filter and said at least one of said at least one QMF synthesis filter, wherein said first QMF analysis filter and said first QMF synthesis filter is placed in said second signal path.

According to an embodiment of the present invention, the magnitude response of a low-frequency branch of said at least one of said at least one QMF analysis filter has a stopband edge frequency $f_{st,L} \approx 0.316 \cdot F_S$, and the magnitude response of a high-frequency branch of said at least one of said at least one QMF analysis filter has a stopband edge frequency $f_{st,H} \approx 0.184 \cdot F_S$, wherein $F_S$ denotes the sampling rate associated with said at least one of said at least one quadrature mirror filter analysis filter; and wherein the magnitude response of a low-frequency branch of said at least one of said at least one QMF synthesis filter has a stopband edge frequency $f_{st,L} \approx 0.316 \cdot F_S$, and wherein the magnitude response of a high-frequency branch of said at least one of said at least one QMF synthesis filter has a stopband edge frequency $f_{st,H} \approx 0.184 \cdot F_S$, wherein $F_S$ denotes the sampling rate associated with said at least one quadrature mirror filter synthesis filter.

According to an embodiment of the present invention, the magnitude response of a low-frequency branch of said at least one of said at least one QMF analysis filter has a stopband edge frequency $f_{st,L}$ relatively close to $F_S/4$, and wherein the magnitude response of a high-frequency branch of said at least one of said at least one QMF analysis filter has a stopband edge frequency $f_{st,H}$ relatively close to $F_S/4$, wherein $F_S$ denotes the sampling rate associated with said at least one of said at least one quadrature mirror filter analysis filter; and wherein the magnitude response of a low-frequency branch of said at least one of said at least one QMF synthesis filter has a stopband edge frequency $f_{st,L}$ relatively close to $F_S/4$, and wherein the magnitude response of a high-frequency branch of said at least one of said at least one QMF synthesis filter has a stopband edge frequency $f_{st,H}$ relatively close to $F_S/4$, wherein $F_S$ denotes the sampling rate associated with said at least one of said at least one quadrature mirror filter synthesis filter.

According to an embodiment of the present invention, said device comprises a filter calculator for calculating the filter coefficients of said at least one finite impulse response filter by using a target equalizer magnitude response, and wherein said filter calculator is fed with said target equalizer magnitude response.

According to an embodiment of the present invention, a first finite impulse response filter of said at least one finite impulse response filter is associated with a first set of filter coefficients, wherein said first finite impulse response filter equalizes a first of said at least two downsampled subband signals; and wherein said filter calculator calculates said first set of filter coefficients by forming a linear phase frequency-domain representation according to a target subband magnitude transfer function, wherein said target subband magnitude transfer function is separated from a target equalizer magnitude response within a frequency band corresponding to said first subband signal, and wherein the inverse discrete fourier transformation of said linear phase frequency-domain representation is calculated in order to obtain said first set of filter coefficients.

According to an embodiment of the present invention, said separator and downsampler comprises N analysis filters with $N \geqq 1$, wherein said analysis filters are arranged in a symmetrical tree structure; and wherein said upsampler and combiner comprise N synthesis filters, wherein said synthesis filters are arranged in a symmetrical tree structure corresponding to said symmetrical tree structure of said N analysis filters.

Each of said N analysis filters may separate and downsample a first digital signal into a first set of at least two downsampled subband signals. Furthermore, each of said N synthesis filters may upsample and combine a corresponding set of at least two downsampled subband signals into a first digital output signal.

Said symmetrical tree structure may be applied in order to downsample and separate said digital signal into at least two downsampled subband signals, wherein each of said at least four downsampled subband signals may have the same bandwidth and the same sampling rate. The arrangement of said analysis filter in a symmetrical tree structure may be understood as a single analysis filter bank, and the arrangement of said synthesis filter in a symmetrical tree structure may be understood as a single synthesis filter bank.

According to an embodiment of the present invention, at least one of said N analysis filters is a quadrature mirror filter analysis filter, and wherein at least one of said N synthesis filters is a quadrature mirror filter synthesis filter.

For instance, each of said N analysis filters is a quadrature mirror filter analysis filter, and each of said N synthesis filters is a quadrature mirror filter synthesis filter. Then, the arrangement of the quadrature mirror filter analysis filter in the symmetrical tree structure and the arrangement of the quadrature mirror filter synthesis filter in the corresponding symmetrical tree structure can be understood as quadrature mirror filter bank.

The advantages concerning the above-mentioned embodiments of the present invention can be similarly applied to the following method.

It is further proposed a method for processing a digital signal, said method comprising separating and downsampling said digital signal into at least two downsampled subband signals; and equalizing at least one of said at least two downsampled subband signals; and upsampling and combining said at least two downsampled subband signals into a digital output signal.

According to an embodiment of the present invention, said separating and downsampling comprises analysis filtering.

According to an embodiment of the present invention, said analysis filtering comprises quadrature mirror filter analysis.

According to an embodiment of the present invention, said upsampling and combining comprises synthesis filtering.

According to an embodiment of the present invention, said synthesis filtering comprises quadrature mirror filter synthesis.

According to an embodiment of the present invention, said digital signal is a digital audio signal.

According to an embodiment of the present invention, said separating and downsampling comprises N times analysis filtering with $N \geqq 2$, wherein said N times analysis filtering being performed according to a non-symmetrical tree structure; and wherein said upsampling and combining comprises N times synthesis filtering, wherein said N times synthesis filtering being performed according to a non-symmetrical tree structure according to said non-symmetrical tree structure of said N times analysis filtering.

According to an embodiment of the present invention, said analysis filtering comprises quadrature mirror filter analysis, and wherein said synthesis filtering comprises quadrature mirror filter synthesis.

According to an embodiment of the present invention, said method comprises delaying of at least one of said at least two downsampled subband signals.

According to an embodiment of the present invention, said delaying comprises group delaying.

According to an embodiment of the present invention, said method comprises delaying of at least one of said at least two downsampled subband signals, and wherein said delaying comprises group delaying, wherein said group delaying is performed to compensate different group delays caused by said non-symmetric tree structure of said N times analysis filtering and the corresponding non-symmetric tree structure of said N times synthesis filtering.

According to an embodiment of the present invention, said analysis filtering comprises quadrature mirror filter analysis, and wherein said synthesis filtering comprises quadrature mirror filter synthesis.

According to an embodiment of the present invention, said equalizing comprises finite impulse response filtering.

According to an embodiment of the present invention, said finite impulse response filtering comprises linear-phase Finite Impulse filtering, and wherein the filter coefficients used for said linear-phase finite impulse response filtering are symmetric.

According to an embodiment of the present invention, said quadrature mirror filter analysis comprises first or higher order allpass filtering.

According to an embodiment of the present invention, said quadrature mirror filter synthesis comprises first or higher order allpass filtering.

According to an embodiment of the present invention, said quadrature mirror filter analysis comprises a first quadrature mirror filter analysis, wherein said first quadrature mirror filter analysis is associated with a sampling rate $F_S$, wherein said first quadrature mirror filter analysis comprises allpass filtering for obtaining a stopband edge frequency $f_{st,L}$ relatively close to $F_S/4$ in the magnitude response of a low-frequency branch of said first QMF analysis and for obtaining a stopband edge frequency $f_{st,H}$ relatively close to $F_S/4$ in the magnitude response of a high-frequency branch of said first QMF analysis.

According to an embodiment of the present invention, said quadrature mirror filter analysis comprises a first quadrature mirror filter analysis, wherein said first quadrature mirror filter analysis is associated with a sampling rate $F_S$, wherein said first quadrature mirror filter analysis comprises allpass filtering for obtaining a stopband edge frequency $f_{st,L} \approx 0.316 \cdot F_S$ in the magnitude response of a low-frequency branch of said first QMF analysis and for obtaining a stopband edge frequency $f_{st,H} \approx 0.184 \cdot F_S$ in the magnitude response of a high-frequency branch of said first QMF analysis.

According to an embodiment of the present invention, said quadrature mirror filter synthesis comprises a first quadrature mirror filter synthesis, wherein said first quadrature mirror filter synthesis is associated with a sampling rate $F_S$, wherein said first quadrature mirror filter synthesis comprises allpass filtering for obtaining a stopband edge frequency $f_{st,L}$ relatively close to $F_S/4$ in the magnitude response of a low-frequency branch of said first QMF synthesis and for obtaining a stopband edge frequency $f_{st,H}$ relatively close to $F_S/4$ in the magnitude response of a high-frequency branch of said second QMF analysis.

According to an embodiment of the present invention, said quadrature mirror filter synthesis comprises a first quadrature mirror filter synthesis, wherein said first quadrature mirror filter synthesis is associated with a sampling rate $F_S$, wherein said first quadrature mirror filter synthesis comprises allpass filtering for obtaining a stopband edge frequency $f_{st,L} \approx 0.316 \cdot F_S$ in the magnitude response of a low-frequency branch of said first QMF synthesis and for obtaining a stopband edge frequency $f_{st,H} \approx 0.184 \cdot F_S$ in the magnitude response of a high-frequency branch of said first QMF synthesis.

According to an embodiment of the present invention, said separating and downsampling comprises analysis filtering, and wherein said analysis filtering comprises quadrature mirror filter analysis, and wherein said upsampling and combining comprises synthesis filtering, and wherein said synthesis filtering comprises quadrature mirror filter synthesis; and wherein said quadrature mirror filter analysis comprises a first quadrature mirror filter analysis, wherein said first quadrature mirror filter analysis comprises a first second order allpass filtering and a second second order allpass filtering, wherein said first second order allpass filtering being performed by a first transfer function $a_0(z)$, and wherein said second second order allpass filtering being performed by a second transfer function $a_1(z)$; and wherein said quadrature mirror filter synthesis comprises a first quadrature mirror filter synthesis, wherein said first quadrature mirror filter synthesis comprises a third second order allpass filtering and a fourth second order allpass filtering, wherein said first second order allpass filtering being performed by said first transfer function $a_0(z)$, and wherein said fourth second order allpass filtering being performed by said second transfer function $a_1(z)$; and wherein said transfer functions $a_0(z)$ and $a_1(z)$ represent second order allpass filters with polyphase components of $9^{th}$ order elliptic filters whose poles are on the imaginary axis.

According to an embodiment of the present invention, said quadrature mirror filter analysis comprises a first quadrature mirror filter analysis, wherein said first quadrature mirror filter analysis comprises a first second order allpass filtering and a second second order allpass filtering, wherein said first second order allpass filtering being performed by a first transfer function $a_0(z)$, and wherein said second second order allpass filtering being performed by a second transfer function $a_1(z)$; and wherein said quadrature mirror filter synthesis comprises a first quadrature mirror filter synthesis, wherein said first quadrature mirror filter synthesis comprises a third second order allpass filtering and a fourth second said first QMF analysis has a stopband edge frequency close to $F_S/4$, and wherein the magnitude response of a high-frequency branch of said first QMF analysis has a stopband edge frequency close to $F_S/4$; and wherein said first quadrature mirror filter synthesis is associated with a sampling rate $F_S$, wherein the magnitude response of a low-frequency branch of said first QMF synthesis has a stopband edge frequency close to $F_S/4$, and wherein the magnitude response of a high-frequency branch of said first QMF synthesis has a stopband edge frequency close to $F_S/4$.

According to an embodiment of the present invention, said separating and downsampling comprises N times analysis filtering with N≧1, wherein said N times analysis filtering being performed according to a symmetrical tree structure; and wherein said upsampling and combining comprises N times synthesis filtering, wherein said N times synthesis filtering being performed according to a symmetrical tree structure according to said symmetrical tree structure of said N times analysis filtering.

According to an embodiment of the present invention, said analysis filtering comprises quadrature mirror filter analysis, and wherein said synthesis filtering comprises quadrature mirror filter synthesis.

According to an embodiment of the present invention, said finite impulse response filtering comprises a first finite impulse response filtering associated with a first set of filter coefficients, wherein said first finite impulse response filtering equalizes a first subband signal of said at least two downsampled subband signals, wherein a linear phase frequency-domain representation is formed according to a target subband magnitude transfer function, wherein said target subband magnitude transfer function is separated from a target equalizer magnitude response within a frequency band corresponding to said first subband signal, and wherein the inverse discrete fourier transformation of said linear phase frequency-domain representation is calculated in order to obtain said first set of filter coefficients. order allpass filtering, wherein said third second order allpass filtering being performed by said first transfer function $a_0(z)$, and wherein said fourth second order allpass filtering being performed by said second transfer function $a_1(z)$; and wherein said transfer functions $a_0(z)$ and $a_1(z)$ represent second order allpass filters with polyphase components of $9^{th}$ order elliptic filters whose poles are on the imaginary axis; and wherein said first quadrature mirror filter analysis corresponds to said first quadrature mirror filter synthesis via said non-symmetric tree structure; and wherein said group delaying is performed by filtering, wherein said filtering corresponds to the following transfer function:

$$T(z) = \frac{z^{-1}a_0(z^2)a_1(z^2)}{2}$$

This transfer function exactly compensates the group delay of a single QMF filter bank (comprising both QMF analysis and synthesis) using second order allpass filters. For some embodiments it is sufficient to use a group delay filter, which approximately compensates the group delay of the QMF filter bank only at frequencies close to the stopband frequency of the QMF.

According to an embodiment of the present invention, said first quadrature mirror filter analysis is associated with a sampling rate $F_S$, and wherein the magnitude response of a low-frequency branch of said first QMF analysis has a stopband edge frequency $f_{st,L} \approx 0.316 \cdot F_S$, and wherein the magnitude response of a high-frequency branch of said first QMF analysis has a stopband edge frequency $f_{st,H} \approx 0.184 \cdot F_S$; and wherein said first quadrature mirror filter synthesis is associated with a sampling rate $F_S$, wherein the magnitude response of a low-frequency branch of said first QMF synthesis has a stopband edge frequency $f_{st,L} \approx 0.316 \cdot F_S$, and wherein the magnitude response of a high-frequency branch of said first QMF synthesis has a stopband edge frequency $f_{st,H} \approx 0.184 \cdot F_S$.

According to an embodiment of the present invention, wherein said first quadrature mirror filter analysis is associated with a sampling rate $F_S$, wherein the magnitude response of a low-frequency branch of According to an embodiment of the present invention, said finite impulse response filtering comprises a first finite impulse response filtering associated with a first set of filter coefficients, wherein said first finite impulse response filtering equalizes a first of said at least two downsampled subband signals, wherein a linear phase frequency-domain representation is formed according with a target subband magnitude transfer function, wherein said target subband magnitude transfer function is separated from a target equalizer magnitude response within a frequency band corresponding to said first subband signal, and wherein the Remez filter design algorithm is applied to said linear phase frequency-domain representation in order to calculate said first set of filter coefficients.

For instance, in case of audio equalization and assuming said digital signal is a digital audio signal having a sampling rate $F_S$, said target equalizer magnitude response may by represented by an ideal target response of an EQ, wherein said ideal target response may span a frequency range from $f_1$ to $f_2$ with $0 \leqq f_1 \leqq f_2 \leqq F_S/2$.

According to an embodiment of the present invention, said target equalizer magnitude response is separated into n subbands in the frequency domain with n≧2.

Said n subbands may be distributed approximately logarithmically (e.g. in octave or third octave bands) yielding to narrow bands at low frequencies and wider bands at high frequencies. This type of EQ band distribution is well justified by the characteristics of human hearing, where the frequency resolution roughly follows the logarithmic scale, and it is also commonly applied in audio equalizer implementations available commercially. Furthermore, said n subbands may be distributed in any other non-uniform manner in the frequency domain.

For instance, the magnitude of said target equalizer magnitude response may be constant in at least one of said n subbands.

According to an embodiment of the present invention, said separating and downsampling comprises analysis filtering, and wherein said analysis filtering comprises quadrature mirror filter analysis, and wherein said upsampling and combining comprises synthesis filtering, and wherein said synthesis filtering comprises quadrature mirror filter synthesis; and wherein said quadrature mirror filter analysis comprises a first quadrature mirror filter analysis, wherein said first quadrature mirror filter analysis comprises a first second order allpass filtering and a second second order allpass filtering; and wherein said quadrature mirror filter synthesis comprises a first quadrature mirror filter synthesis, wherein said first quadrature mirror filter analysis comprises a third second order allpass filtering and a fourth second order allpass filtering; and wherein said first quadrature mirror filter synthesis corresponds to said first quadrature mirror filter synthesis; and wherein said first quadrature mirror filter analysis and said first quadrature mirror filter synthesis are associated with a sampling rate $F_S$, and the magnitude response of a low frequency branch of said QMF analysis and synthesis has a stopband edge frequency $f_{st,L} \geqq F_S/4$, and wherein the magnitude response of a high frequency branch of said QMF analysis and synthesis has the stopband edge frequency $f_{st,H} \leqq F_S/4$; and wherein said target equalizer magnitude response is constant in the frequency region between $f_{st,H}$ and $f_{st,L}$. Said low-frequency branch's stopband edge frequency $f_{st,L}$ and said high-frequency branch's stopband edge frequency $f_{st,H}$ may be related via $f_{st,H}=0.5 \cdot F_S - f_{st,L}$.

According to an embodiment of the present invention, said n subbands of said target equalizer magnitude response correspond to n−b 1 crossover frequencies, and wherein said n−1 crossover frequencies are arranged in order that none of said n−1 crossover frequencies lies in said frequency region between $f_{st,H}$ and $f_{st,L}$.

According to an embodiment of the present invention, said n subbands of said target equalizer magnitude response are distributed logarithmically.

According to an embodiment of the present invention, said equalizing comprises infinite impulse response filtering.

It is further proposed a software application program for equalizing a digital signal, said software application program comprising: program code for separating and downsampling said digital signal into at least two downsampled subband signals; and program code for equalizing at least one of said at least two downsampled subband signals; and program code for upsampling and combining said at least two downsampled subband signals into a digital output signal.

Said software application program may further comprise program code to perform the above-mentioned method steps.

It is further proposed a software application program product comprising a storage medium having a software application for equalizing a digital signal according to the above-mentioned software application embodied therein.

It is further proposed an audio device comprising the above-mentioned device.

According to an embodiment of the present invention, it is further proposed an audio device wherein said equalizer comprises at least one finite impulse response (FIR) filter; and wherein said audio device comprises a filter calculator for calculating the filter coefficients of said at least one finite impulse response filter by using a target equalizer magnitude response, wherein said audio device comprises an user interface in order to obtain said target equalizer magnitude response, wherein said user interface is connected to said filter calculator to transmit said target equalizer magnitude response to said filter calculator.

According to an embodiment of the present invention, it is further proposed an audio device wherein said equalizer comprises at least one infinite impulse response (IIR) filter; and wherein said audio device comprises a filter calculator for calculating the filter coefficients of said at least one infinite impulse response filter by using a target equalizer magnitude response, wherein said audio device comprises an user interface in order to obtain said target equalizer magnitude response, wherein said user interface is connected to said filter calculator to transmit said target equalizer magnitude response to said filter calculator.

These and other aspects of the invention will be apparent from and elucidated with reference to the embodiments described hereinafter.

DETAILED DESCRIPTION OF THE INVENTION

The present invention proposes to equalize a digital signal by separating and downsampling said digital signal into at least two downsampled subband signals; by equalizing at least one of said at least two downsampled subband signals; and by upsampling and combining said at least two downsampled subband signals into an output digital signal.

In the following, the present invention will be described for a preferred embodiment.

In this preferred embodiment, a digital audio signal is equalized according to the present invention. Said equalizing may be performed according to a target equalizer transfer function, wherein said equalizer (EQ) target transfer function is represented by a target EQ magnitude response 100,203.

Figure 1:
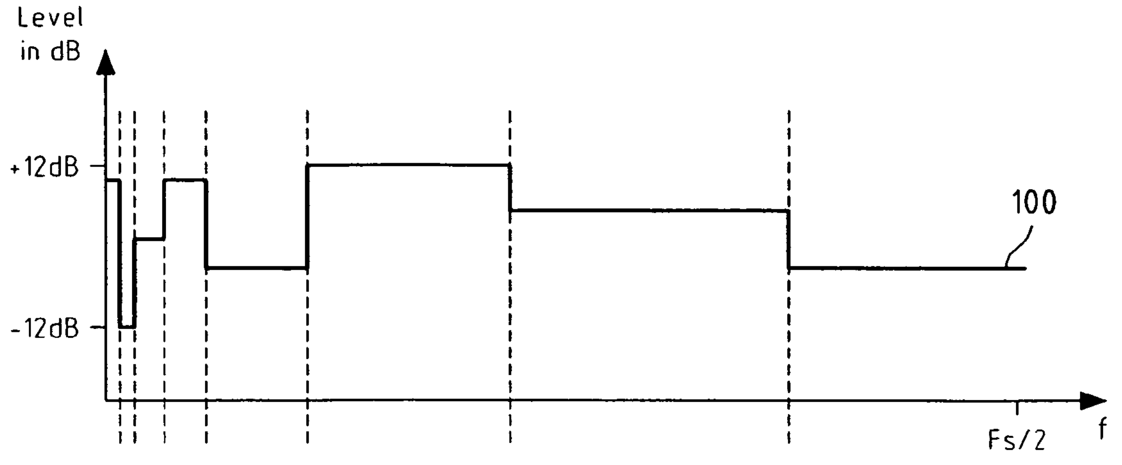
FIG. 1: an illustration of a target equalizer magnitude response in the frequency domain.
Figure 2:
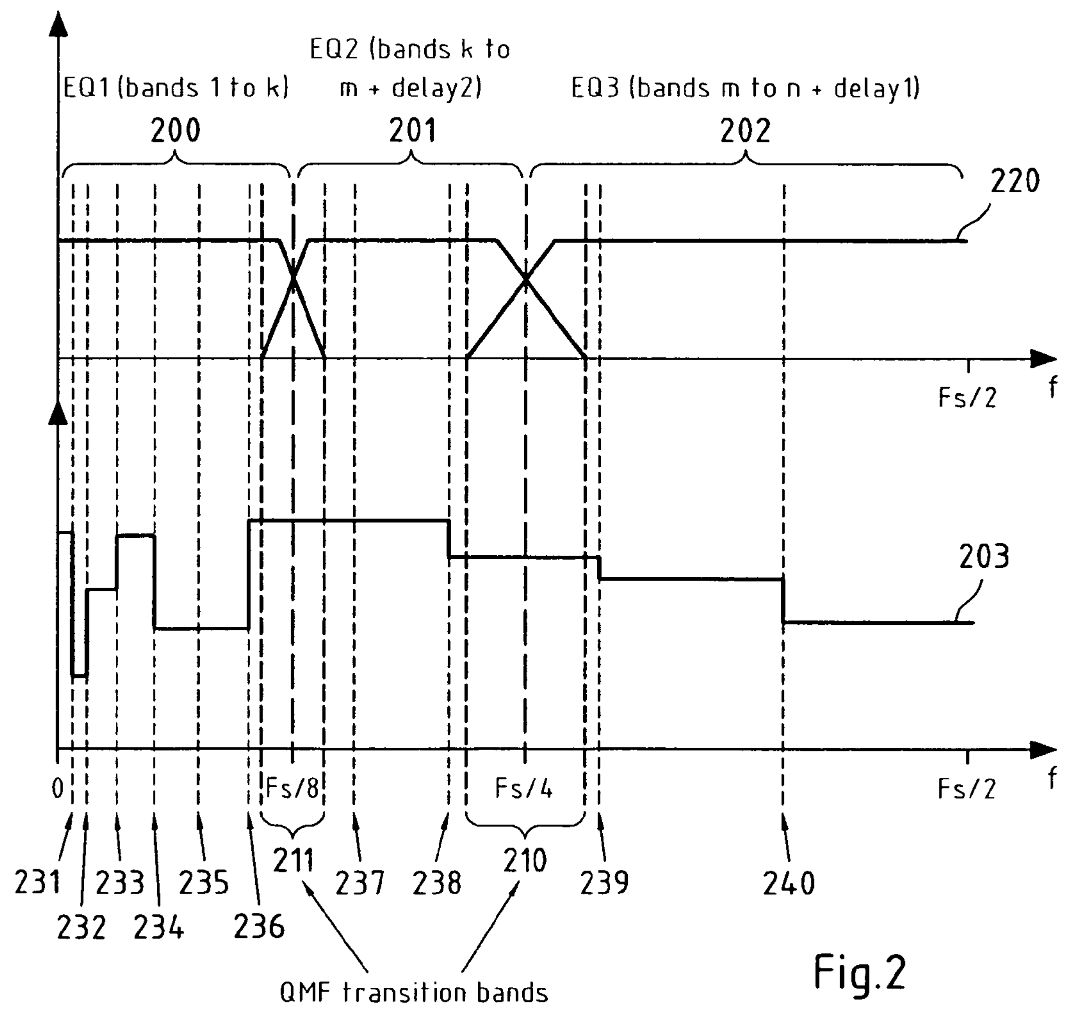
FIG. 2: an illustration of subbands of downsampled subband signals and a target equalizer magnitude response in the frequency domain according to a preferred embodiment of the present invention.

FIG. 2 schematically depicts the separating of an available frequency region of said digital audio signal into three subbands 200,201,202, wherein said available frequency range of said digital audio signal spans a frequency range from $f_1=0$ Hz to $f_2=F_S/2$, and wherein $F_S$ denotes the sampling rate of said digital audio signal and $f_2=F_S/2$ denotes the corresponding the Nyquist frequency.

Figure 3:
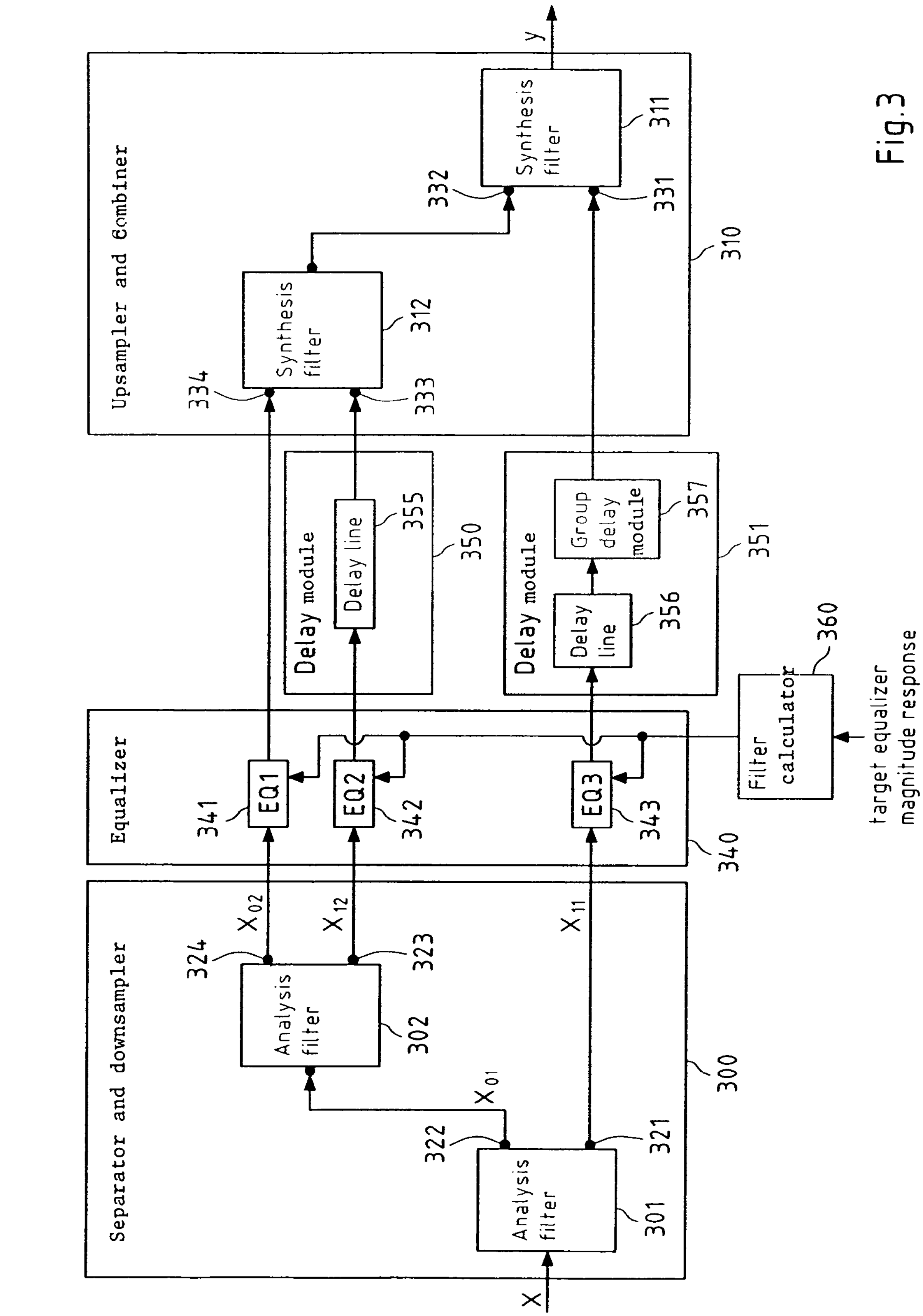
FIG. 3: a schematic presentation of components of a device for equalization according to a preferred embodiment of the present invention.

The equalization of said digital audio signal will be performed on three downsampled subband signals corresponding to said three subbands, wherein said three downsampled subband signals are downsampled and separated from said digital audio signal by said separator and downsampler 302, 322 as can be seen from FIG. 3. A first subband 200 spans a frequency range from $f_{1,1}=0$ Hz to $f_{2,1}=F_S/8$, a second subband 201 spans a frequency range from $f_{1,2}=F_S/8$ to $f_{2,2}=F_S/4$, and a third subband 202 spans a frequency range from $f_{1,3}=F_S/4$ to $f_{2,3}=F_S/2$.

Furthermore, FIG. 2 schematically depicts the magnitude of a given equalizer (EQ) target transfer function 203, wherein this target EQ magnitude response 100, 203 is separated into n=9 target equalizer bands in the frequency domain which are approximately logarithmically distributed.

FIG. 3 depicts a schematic presentation of the components of a device for equalization according to the preferred embodiment of the present invention. The operation of equalization will now be explained in detail and will be referenced to the method according to the present invention depicted as a flow chart in FIG. 7. It should be noted that this flowchart is of rather general nature and is not limited to the preferred embodiment.

Figure 7:
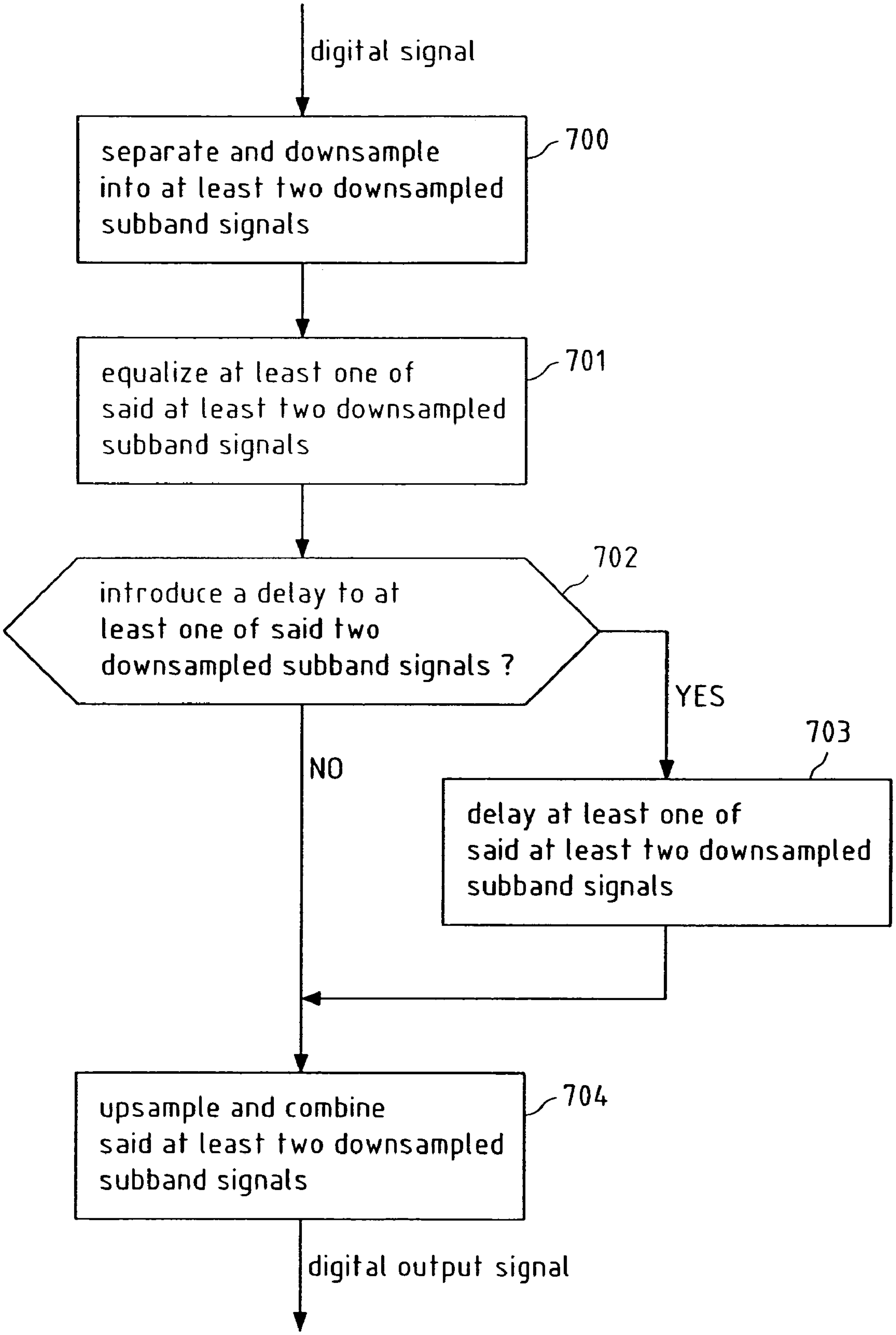
FIG. 7: a flowchart of a method for equalizing in downsampled subband domains according to a preferred embodiment of the present invention.

Said device comprises a separator and downsampler 300 wherein said separator and downsampler 300 separates and downsamples a digital signal x into said three downsampled subband signals $x_{02}$,$x_{12}$,$x_{11}$ in accordance with step 700, wherein said digital signal x represents a digital audio signal according to the preferred embodiment. Furthermore, said device comprises an equalizer 340 in order to equalize said three downsampled subband signals according to step 700 as depicted in FIG. 7. Further, said device comprises a first delay module 350 and a second delay module 351, wherein said first delay module 350 introduces a delay to downsampled subband signal $x_{12}$, and said second delay module 351 introduces a delay to downsampled subband signal $x_{11}$ in conformity with step 703. Said device comprises an upsampler and combiner 310, wherein said upsampler and combiner 310 upsample and combine said three downsampled subband signals according to step 704, after being signal processed by said equalizer 340 and by said delay module 350,351 into a digital output signal y.

In the following, the separating and downsampling is explained in details:

The separator and downsampler 300 comprises a first analysis filter 301 and a second analysis filter 302, wherein said analysis filters 301,302 are arranged in a non-symmetric tree structure. In this preferred embodiment, said first analysis filter 301 is represented by a first quadrature mirror filter (QMF) analysis filter 301 and said second analysis filter 302 is represented by a second quadrature mirror filter (QMF) analysis filter 302, but in general, said analysis filters are not restricted to said QMF analysis filters.

The upsampler and combiner 310 comprise a first synthesis filter 311 and a second synthesis filter 312, wherein said synthesis filters 311,312 are arranged in a non-symmetrical tree structure, wherein said non-symmetric tree structure corresponds to said tree structure of said analysis filter. In this preferred embodiment, said first synthesis filter 311 is represented by a first quadrature mirror filter synthesis filter 311 and said second synthesis filter 312 is represented by a second quadrature mirror filter (QMF) synthesis filter 312, but in general, said synthesis filters are not restricted to said QMF synthesis filters.

Said first QMF analysis filter 301 separates and downsamples said digital audio signal x into two downsampled subband signals $x_{01}$ and $x_{11}$, wherein the subband of $x_{01}$ spans a frequency range from 0 Hz to $F_S/4$, and wherein the subband of $x_{11}$ spans a frequency range from $F_S/4$ to $F_S/2$, and wherein $x_{01}$ and $x_{11}$ have a sampling rate being half of the sampling rate $F_S$ of said digital audio signal x. For instance, assuming a sampling rate of $F_S=48000$ Hz associated with said digital audio signal would lead to a sampling rate of 24000 Hz for said two downsampled subband signals $x_{01}$ and $x_{11}$. Said subband signal $x_{11}$ is outputted from a first output 321 of said first QMF analysis filter 301, and said subband signal $x_{01}$ is output from a second output 322 of said first QMF analysis filter 301.

According to the non-symmetric tree structure of said analysis filters 301,302, the downsampled subband signal $x_{01}$ is separated and downsampled by said second QMF 302 into a first downsampled subband signal $x_{02}$ and into a second downsampled subband signal $x_{12}$, wherein the subband of $x_{02}$ corresponds to said first subband 200 spanning a frequency range from $f_{11}=0$ Hz to $f_{2,1}=F_S/8$, and wherein the subband of $x_{12}$ corresponds to said second subband 201 spanning a frequency range from $f_{1,2}=F_S/8$ to $f_{2,2}=F_S/4$. The sampling rate $F_{S,1}$ of said first downsampled subband signal $x_{02}$ is $F_{S,1}=F_S/4$, and the sampling rate $F_{S,2}$ of said second downsampled subband signal $x_{12}$ is also $F_{S,2}=F_S/4$. The downsampled subband signal $x_{11}$, which is outputted from said first QMF 301, is not fed to another analysis filter, furthermore, the subband of signal $x_{11}$ corresponds to said third subband 202 spanning a frequency range from $f_{1,3}=F_S/4$ to $f_{2,3}=F_S/2$.

Thus, said separator and downsampler 300 separates and downsamples said digital audio signal x into said first downsampled subband signal $x_{02}$, and into said second downsampled subband signal $x_{12}$, and into a third downsampled subband signal $x_{11}$, wherein the subbands of said three downsampled subband signals correspond to said three subbands 200,201,202. Said separator and downsampler 300 may comprise more than two analysis filters in order to separate and downsample the digital signal in more than three subbands. Furthermore, the structure of said analysis filters is not restricted to a non-symmetric tree structure. For instance, said analysis filter may be arranged in form of a symmetric tree structure or in form of a filter bank.

In the following, the design of QMF analysis filter and QMF synthesis filter with respect to the characteristic of the target equalizer magnitude response 100,203 is explained in detail.

Figure 4:
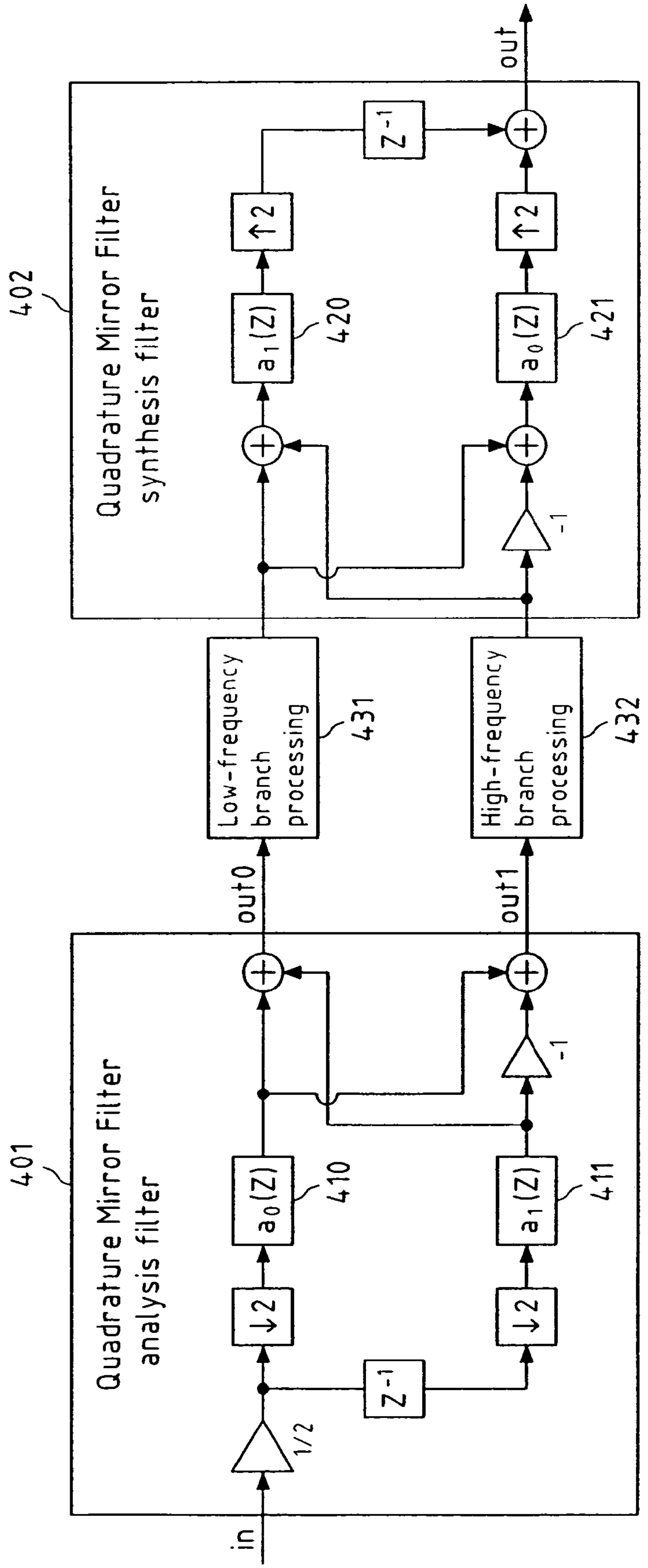
FIG. 4: a schematic presentation of components of a quadrature mirror filter analysis filter and an quadrature mirror filter synthesis filter according to a preferred embodiment of the present invention.

FIG. 4 depicts a schematic presentation of the components of a QMF analysis filter 401 and a corresponding QMF synthesis filter 402, wherein said QMF analysis filter 401 and said corresponding QMF synthesis filter 402 represents a QMF analysis and synthesis couple. For instance, at least one of said analysis filters 301,302 and the corresponding synthesis filters 311,312 to said at least one of said analysis filters could be represented by at least one of said QMF analysis and synthesis couple, wherein said corresponding synthesis filter may correspond to said at least one of said analysis filters via said non-symmetric tree structure of said analysis filter and of said synthesis filter. For example said first QMF analysis filter 301 and said first QMF synthesis filter 311 could be implemented by said QMF analysis and synthesis couple, and/or said second QMF analysis filter 302 and said second QMF synthesis filter 312 could be implemented by said QMF analysis and synthesis couple.

In order to achieve a sufficient stopband attenuation of the QMF analysis and synthesis couple even in case of large magnitude response level variations (e.g., +/±15 dB) of the target equalizer magnitude response 100,203 it is proposed to implement second order or higher order allpass filters for the realisation of the filters $a_0(z)$ 410,421 and the filters $a_1(z)$ 411,420 of said QMF analysis filter 401 and said QMF synthesis filter 402.

In the preferred embodiment, said QMF analysis filter 401 comprises a first second order allpass filter 410 and a second second order allpass filter 411, wherein said first second order allpass filter 410 has a first transfer function $a_0(z)$ and said second second order allpass filter 411 has a second transfer function $a_1(z)$. Furthermore, said corresponding QMF synthesis filter 402 comprises a third second order allpass filter 421 and a fourth second order allpass filter 420, wherein said third second order allpass filter 421 has said first transfer function $a_0(z)$ and said fourth second order allpass filter 420 has said second transfer function $a_1(z)$. Said first transfer function $a_0(z)$ has the form $$a_0(z) = \frac{\alpha_{01} + \alpha_{02}z^{-1} + 1z^{-2}}{1 + \alpha_{02}z^{-1} + \alpha_{01}z^{-2}},$$

and said second transfer function $a_1(z)$ has the form $$a_1(z) = \frac{\alpha_{11} + \alpha_{12}z^{-1} + 1z^{-2}}{1 + \alpha_{12}z^{-1} + \alpha_{11}z^{-2}},$$

wherein said allpass filters 410,411,420,421 are polyphase components of $9^{th}$ order elliptic filters whose poles are on the imaginary axis. However, said allpass filter design is not restricted to second order allpass filters. For instance, higher order allpass filter may be implemented, which may lead to a higher stopband attenuation, and, further, even first order allpass filter may be implemented which may lead to decreased implementation costs. Furthermore, said allpass filters are not restricted being polyphase components of $9^{th}$ order elliptic filters whose polse are on the imaginary axis. For instance, said allpass filters may be implemented being polyphase components of decreased or increased order elliptic filter compared to the $9^{th}$ order, e.g. being polyphase components of $8^{th}$ order, $12^{th}$ order or $13^{th}$ order.

Figure 5:
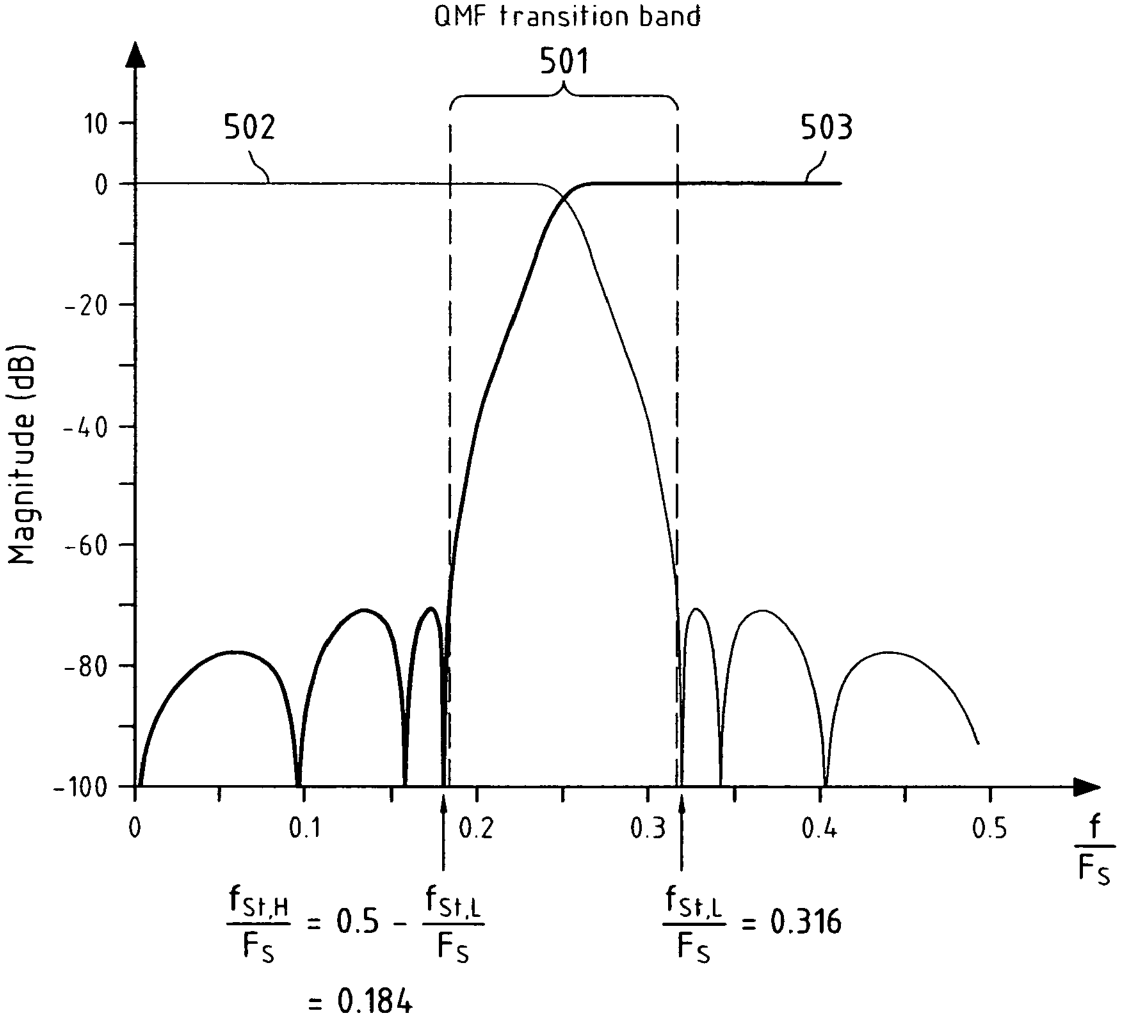
FIG. 5: a magnitude transfer function of the quadrature mirror filter analysis filter and the quadrature mirror filter synthesis filter of FIG. 4.

A criteria for the QMF allpass filter design includes the minimum stopband attenuation and the stopband edge frequency $f_{st,L}$ of the magnitude response of the low-frequency branch of said QMF analysis filter 401 and said QMF synthesis filter 402, and it includes the minimum stopband attenuation and the stopband edge frequency $f_{st,H}$ of the magnitude response of the high-frequency branch of said QMF analysis filter 401 and said QMF synthesis filter 402. For the use of said QMF analysis filter 401 and said corresponding QMF synthesis filter 402 in a device for equalization, it is desirable to have the stopband edge frequencies $f_{st,L}$ and $f_{st,H}$ as close as possible to $F_S/4$, wherein $F_S$ denotes the sampling frequency associated with the QMF analysis filter and the corresponding QMF synthesis filter, as the stopband edge frequencies $f_{st,L}$ and $f_{st,H}$ define the width (from $f_{st,H}$ to $f_{st,L}$) of the QMF bank transition band 210,211,501, as depicted in FIG. 5. The low-frequency branch's stopband edge frequency $f_{st,L}$ and the high-frequency branch's stopband edge frequency $f_{st,H}$ of a QMF bank are related via $f_{st,H}=0.5 \cdot F_S - f_{st,L}$. Within each QMF transition band 210,211,501 said target EQ magnitude response 100,203 should be constant in order to avoid aliasing. Thus, each of the crossover frequencies 231,232,233, 234,235,236,237,238,239,240 of the n subbands of said target equalizer magnitude response 100,203 has to be chosen being outside of each of the QMF transition bands 210,211.

On the other hand, by allowing larger values of $f_{st,L}$, and thus smaller values of $f_{st,H}$, it is possible to increase the stopband attenuation, which reduces the risk of audible aliasing of frequency components, which is caused by large variations in the levels of the target EQ magnitude response 100, 203, and too small stopband attenuation.

Thus, the allpass filter coefficients of said first, second, third and fourth second order allpass filter of said QMF analysis and synthesis couple, i.e. said QMF bank, are designed so that the stopband edge frequency of the magnitude response of the low-frequency frequency branch is set to $f_{st,L} \approx 0.316 \cdot F_S$ and that the stopband edge frequency of the magnitude response of the high-frequency branch is set to $f_{st,H} \approx 0.184 \cdot F_S$ for this preferred embodiment. FIG. 5 depicts the magnitude response 502 of the low-frequency branch 431 associated with said QMF analysis and synthesis couple, and FIG. 5 depicts the magnitude response 503 of the high-frequency branch 432 associated with said QMF analysis and synthesis couple.

Furthermore, FIG. 5 depicts the QMF transition band 501 of said QMF synthesis and analysis couple, wherein said QMF transition band 501 spans a frequency range from $0.184 \cdot F_S$ to $0.316 \cdot F_S$ according to said stopband edge frequencies $f_{st,H} \approx 0.184 \cdot F_S$ and $f_{st,L} \approx 0.316 \cdot F_S$. Within said QMF transition band, said equalizer (EQ) target magnitude response 100,203 must remain constant. FIG. 2 depicts the QMF transition bands 210,211 according to the first preferred embodiment, wherein said QMF synthesis and analysis couple is applied for said first QMF analysis filter 301 and said first QMF synthesis means 311, and wherein said QMF synthesis and analysis couple is applied for said second QMF analysis filter 302 and for said second QMF synthesis filter 312. A first QMF transition band 210 is caused by said first QMF analysis filter 301 and said first QMF synthesis filter 311, and a second QMF transition band 210 is caused by said second QMF analysis filter 302 and said second QMF synthesis filter 311. Within said first QMF transition band and said second QMF transition band said target EQ magnitude response 100,203 must remain constant, as depicted in FIG. 2, in order to maintain a high audio quality.

Assuming a sampling rate of $F_S$=48000 Hz for said digital audio signal x, said first QMF transition band 211 is in the frequency range from 4416 Hz to 7584 Hz, and said second QMF transition band 210 is in the frequency range from 8832 Hz to 15168 Hz.

In the following, the details of equalization will be explained, in particular the calculation of the filter coefficients in dependency on the target EQ magnitude response.

The equalization of said three downsampled subband signals is performed by said equalizer 340, wherein said equalizer 340 comprises a first finite impulse response (FIR) filter 341, wherein said first FIR filter 341 equalizes said first downsampled subband signal $x_{02}$, and wherein said equalizer 340 comprises a second FIR filter 342, wherein said second FIR filter 342 equalizes said second downsampled subband signal $x_{12}$, and wherein said equalizer 340 comprises a third FIR filter 343, wherein said third FIR filter 343 equalizes said third downsampled subband signal $x_{11}$. Thus, said equalization is performed in downsampled frequency subband domains, which reduces the computational complexity and the memory consumption of said equalization compared to an equalization performed on the full sampling rate and the full bandwidth.

Figure 6:
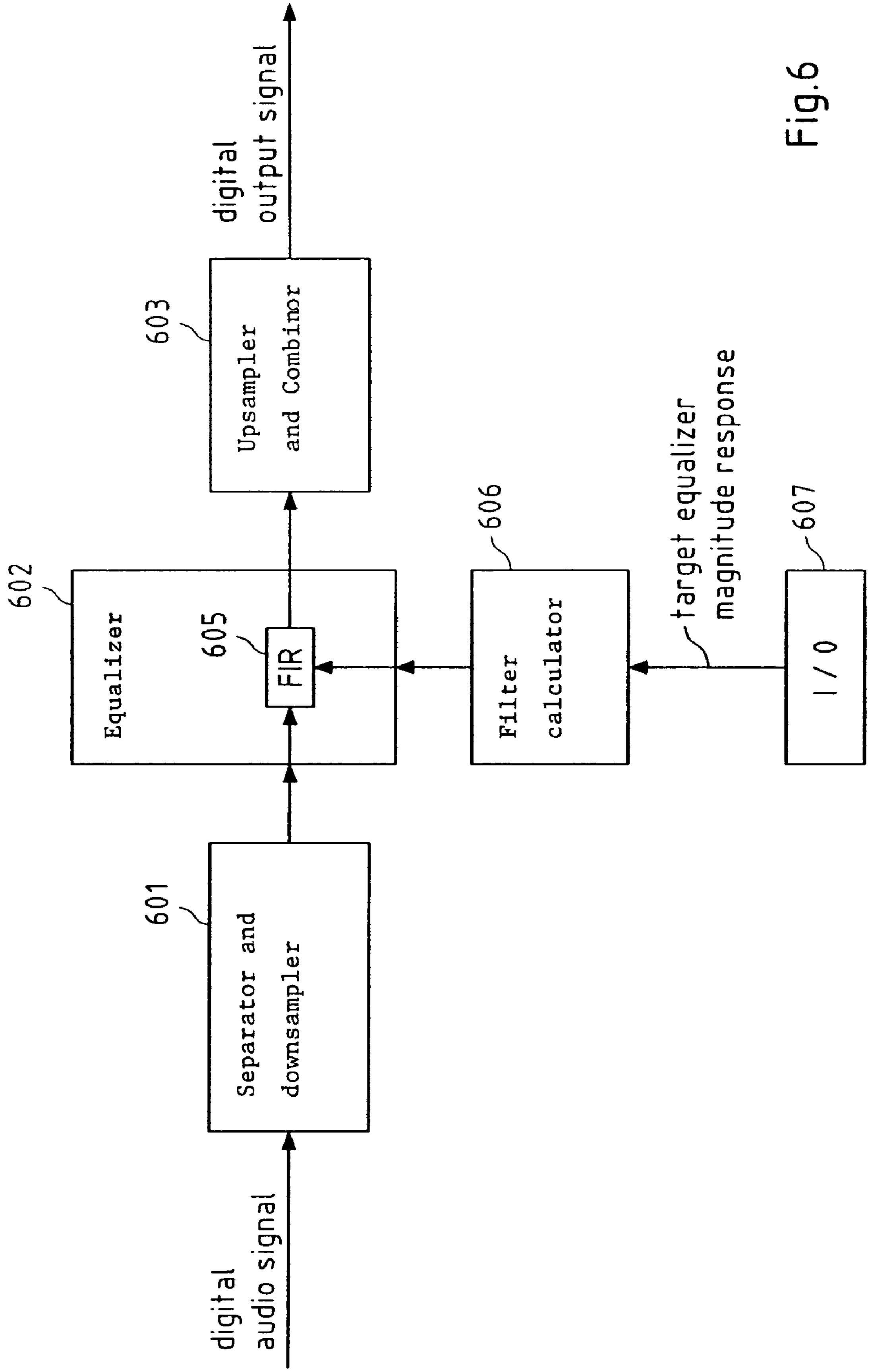
FIG. 6: a schematic presentation of components of an audio device according to a preferred embodiment of the present invention.

In order to obtain the filter coefficients of said first FIR filter 341, a linear phase frequency-domain representation is formed according to a target subband magnitude transfer function, wherein said target subband magnitude transfer function is separated from the target equalizer magnitude response 100,203 within said first subband 200, and wherein the inverse discrete fourier transformation of said linear phase frequency-domain representation is calculated in order to obtain said filter coefficients of said first FIR filter 341. As depicted in FIG. 2, said target subband magnitude transfer function is represented by bands 1 to k of said target equalizer magnitude response 203. The coefficients of the remaining FIR filters 342, 343 may be calculated in the same way. This calculation of the filter coefficients is performed by the filter calculator 360, as depicted in FIG. 3. Therefore, the target EQ magnitude response may be fed to said filter calculation means. Furthermore, said target EQ magnitude response may by interactively obtained from a user via an interface 607, as depicted in FIG. 6.

In the following, the details of said delay module 350,351 for delaying of at least one of said downsampled subband signals will be explained in detail.

According to the first preferred embodiment, the length of said first FIR filter 341 may be larger than the length of said second FIR filter 342, as said first FIR filter 341 requires a higher order than said FIR filter 342 as there are more target equalizer bands in said first subband 200 than in said second subband 201 due to the logarithmic distribution of said target equalizer bands. Thus, a delay module 350 may be needed for delaying said second downsampled subband signal in order to compensate for the delay mismatch introduced by different group delays of said first FIR filter 341 and said second FIR filter 342. This step of delaying is depicted as step 703 in the flowchart in FIG. 7. For the present preferred embodiment, the use of symmetric, linear-phase FIR filters is suggested, which leads to a constant group delay for all frequencies for each of said symmetric, linear-phase FIR filters. Thus, a simple delay line 355 (without any fractional delays) is sufficient for the FIR delay compensations.

Furthermore, said non-symmetric tree structure of said analysis filters 301,302 and said synthesis filters 311,312 may introduce a delay mismatch between a first signal path and a second signal path, wherein said first signal path begins at a first output 321 of a first analysis filter 301, and wherein said first signal path end at a first input 331 of a first synthesis filter 311, and wherein said second signal path begins at a second output 322 of said first analysis filter 301, and wherein said second signal path ends at a second input 332 of said second synthesis filter 311, and wherein said first synthesis filter 311 corresponds to said first analysis filter 301 via said non-symmetric tree structure. Said second signal path comprises a second analysis filter 302 and a second synthesis filter 312, wherein said second analysis filter 302 and said second synthesis filter 312 introduce a group delay associated with said second signal path, which has to be compensated in said first signal path in order to reconstruct output signal y correctly by applying said first synthesis filter 311. To perform this compensation, a second delay module 351 is placed in said first signal path which comprises a group delay module 357 in order to delay said third downsampled subband signal. This step of delaying corresponds to step 703 in the flowchart in FIG. 7.

To avoid strong aliasing of downsampled signal components, it is crucial that the group delay has to be matched especially in the transition region of the QMF filter bank. If said second analysis filter 302 and said second synthesis filter 312 is represented by said QMF analysis and synthesis couple, wherein said QMF analysis and synthesis couple comprises said second order allpass filters, said group delay module 354 may be performed by implementing a filter with the transfer function $$T(z) = \frac{z^{-1}a_0(z^2)a_1(z^2)}{2}.$$

Said transfer function $$T(z) = \frac{z^{-1}a_0(z^2)a_1(z^2)}{2}$$

may also be used for obtaining an exact group delay compensation caused by non second order allpass filters. Filter with a different/simpler transfer function than the above transfer function T(z) may also be used for group delay compensation in the transition region of the QMF filter bank, which is not as complete as that of T(z), and does not necessarily compensate the group delay of the QMF bank elsewhere in the frequency domain but in the said transition region.

Furthermore, said first signal path may further be delayed by a delay module 356, which is located in said second delay module 351 in order to compensate for a delay mismatch between said third FIR filter 343 and said first FIR filter 341, and/or for compensating for a delay mismatch between said third FIR filter 343 and said second FIR filter 342 and said delay module 352. Furthermore, said group delay module 357 for compensating for the delay mismatch introduced by said QMF analysis and synthesis couple may also be performed by a delay line, but this introduces the drawback of reduced audio quality. In particular, when the group delay introduced by said QMF analysis and synthesis couple is an integer number at half the Nyquist frequency, said delay line may be used for performing said group delay module 357.

In particular, if a subband of a downsampled subband signal corresponds to a plurality of EQ bands, wherein said plurality of EQ bands has very different magnitude levels at adjacent bands (causing steep level changes close to the crossover frequencies between adjacent bands), the computational complexity of the corresponding equalizer increases. Thus, in this preferred embodiment said first FIR filter 341 has a higher computational complexity compared to the second FIR filter 342 or compared to the third FIR filter 343. Due to the present invention, the second FIR filter 342 and the third FIR filter 343 can be implemented with a low computational complexity, as there exists only two corresponding bands of the target EQ magnitude response 203 each associated with said second or said third subband, and, due to the wider bandwidths of the frequency bands that the second and the third FIR filters implement, the magnitude change between adjacent bands may occur over wider frequency range than in the lowest EQ bands, which is implemented by the first FIR filter.

FIG. 6 schematically depicts the main components of an audio device according to another preferred embodiment of the present invention, wherein said audio device comprises an interface 607 which may be used to obtain said target EQ magnitude interactively by a user. Furthermore said interface 607 may be a graphic user interface 607, which is able to display the actual target EQ magnitude response. For this case, this audio device for equalizing a digital audio signal represents a graphic audio equalizer, as it enables visual and interactive way of frequency balance modification of audio in real time. Said interface is connected to the filter calculator 606,360 which calculates and adjusts the filter coefficients of at least one FIR filter 605, wherein said at least one FIR filter 605 is located inside the equalizer 602.

The main advantage of the present invention are the reduced complexity and smaller memory requirements for the implementation compared to an implementation where the signal processing is performed at the full sampling rate. Furthermore, it enables a flexible design of the target EQ magnitude response with respect to the crossover frequencies and bandwidths of the EQ bands.

The invention has been described above by means of preferred embodiments. It should be noted that there are alternative ways and variations which are obvious to a skilled person in the art and can be implemented without deviating from the scope and spirit of the appended claims. In particular, the present invention is not restricted to equalization of an audio signal. It may equally well applied in systems that have to equalize any digital signal, for instance in order to equalize a received digital signal that has been distorted. Said distortion may for instance be caused by a transmission of said digital signal over an intersymbol-interference channel. Furthermore, it should be noted that the present invention is not restricted to non-symmetric tree structures concerning the separator and downsampler 300 and concerning the upsampler and combiner 310. As a matter of course also symmetric tree structures may be applied for the separator and downsampler 300 and for the upsampler and combiner 310. For instance, this symmetric tree structure could be used to separate the digital signal into a plurality of subsignals each having the same bandwidth. Further, at least one delay module 350, 351 may also be applied to at least one frequency branch in order to compensate for different group delays of different frequency branches.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:

a separator and downsampler for separating and downsampling a digital signal into at least two downsampled subband signals;

an equalizer for equalizing at least one of said at least two downsampled subband signals; and an upsampler and combiner for upsampling and combining said at least two downsampled subband signals into a digital output signal, wherein said separator and downsampler comprises N analysis filters with $N \geqq 2$, wherein said analysis filters are arranged in a non-symmetrical tree structure; and wherein said upsampler and combiner comprise N synthesis filters, wherein said synthesis filter are arranged in a non-symmetrical tree structure corresponding to said non-symmetrical tree structure of said N analysis filters.

2. The apparatus according to claim 1, wherein said separator and downsampler comprises at least one analysis filter.

3. The apparatus according to claim 2, wherein at least one of said at least one analysis filter is a quadrature mirror filter analysis filter.

4. The apparatus according to claim 1, wherein said upsampler and combiner comprise at least one synthesis filter.

5. The apparatus according to claim 4, wherein at least one of said at least one synthesis filter is an quadrature mirror filter synthesis filter.

6. The apparatus according to claim 1, wherein said digital signal is a digital audio signal.

7. The apparatus according to claim 1, wherein at least one of said N analysis filters is a quadrature mirror filter analysis filter, and wherein at least one of said N synthesis filters is a quadrature mirror filter synthesis filter.

8. The apparatus according to claim 1, wherein said apparatus comprises at least one delay module for delaying at least one of said at least two downsampled subband signals.

9. The apparatus according to claim 8, wherein at least one of said at least one delay module comprises a group delay module.

10. The apparatus according to claim 1, wherein a first of said N analysis filters comprises at least two outputs for outputting at least two digital signals, and wherein a first of said N synthesis filters comprises at least two inputs for inputting at least two digital signals, wherein said first synthesis filter corresponds to said first analysis filter via said non-symmetric tree structure; and wherein a first signal path begins at a first output of said at least two outputs of said first analysis filter, wherein said first signal path ends at a first input of said at least two inputs of said first synthesis filter, and wherein a second signal path begins at a second output of said at least two outputs of said first analysis filter, and wherein said second signal path ends at a second input of said at least two inputs of said first synthesis filter; and wherein said apparatus comprises at least one delay module for delaying at least one of said at least two subband signals, wherein at least one of said at least one delay module comprises a group delay module, and wherein said group delay module is arranged for compensating for different group delays between said first signal path and said second signal path.

11. The apparatus according to claim 10, wherein at least one of said at least one analysis filter is a quadrature mirror filter analysis filter, and wherein at least one of said at least one synthesis filter is a quadrature mirror filter synthesis filter.

12. The apparatus according to claim 1, wherein said equalizer comprises at least one finite impulse response filter.

13. The apparatus according to claim 12, wherein at least one of said at least one finite impulse response filter is a symmetric, linear-phase finite impulse response filter.

14. The apparatus according to claim 3, wherein at least one of said at least one quadrature mirror filter analysis filter comprises first or higher order allpass filters.

15. The apparatus according to claim 5, wherein at least one of said at least one quadrature mirror filter synthesis filter comprises first or higher order allpass filters.

16. The apparatus according to claim 14, wherein at least one of said at least one quadrature mirror filter analysis filter comprises a first allpass filter and a second allpass filter, and wherein said at least one of said at least one quadrature mirror filter analysis filter is associated with a sampling rate $F_S$, and wherein the magnitude response of the low-frequency branch of said at least one of said at least one quadrature mirror filter analysis filter has a stopband edge frequency $f_{st,L}$ relatively close to $F_S/4$, and wherein the magnitude response of the high-frequency branch of said at least one of said at least one quadrature mirror filter analysis filter has a stopband edge frequency $f_{st,H}$ relatively close to $F_S/4$.

17. The apparatus according to claim 14, wherein at least one of said at least one quadrature mirror filter analysis filter comprises a first allpass filter and a second allpass filter, and wherein said at least one of said at least one quadrature mirror filter analysis filter is associated with a sampling rate $F_S$, and wherein the magnitude response of the low-frequency branch of said at least one of said at least one quadrature mirror filter analysis filter has a stopband edge frequency $f_{st,L} \approx 0.316 \cdot F_S$, and wherein the magnitude response of the high-frequency branch of said at least one of said at least one quadrature mirror filter analysis filter has a stopband edge frequency $f_{st,H} \approx 0.184 \cdot F_S$.

18. The apparatus according to claim 15, wherein at least one of said at least one quadrature mirror filter synthesis filter comprises a first allpass filter and a second allpass filter, and wherein said at least one of said at least one quadrature mirror filter synthesis filter is associated with a sampling rate $F_S$, and wherein the magnitude response of the low-frequency branch of said at least one of said at least one quadrature mirror filter synthesis filter has a stopband edge frequency $f_{st,L}$ relatively close to $F_S/4$, and wherein the magnitude response of the high-frequency branch of said at least one of said at least one quadrature mirror filter synthesis filter has a stopband edge frequency $f_{st,H}$ relatively close to $F_S/4$.

19. The apparatus according to claim 15, wherein at least one of said at least one quadrature mirror filter synthesis filter comprises a first allpass filter and a second allpass filter, and wherein said at least one of said at least one quadrature mirror filter synthesis filter is associated with a sampling rate $F_S$, and wherein the magnitude response of the low-frequency branch of said at least one of said at least one quadrature mirror filter synthesis filter has a stopband edge frequency $f_{st,L} \approx 0.316 \cdot F_S$, and wherein the magnitude response of the high-frequency branch of said at least one of said at least one quadrature mirror filter synthesis filter has a stopband edge frequency $f_{st,H} \approx 0.184 \cdot F_S$.

20. The apparatus according to claim 1, wherein said separator and downsampler said digital signal comprises at least one analysis filter, and wherein said upsampler and combiner for upsampling and combining said digital signal comprise at least one synthesis filter; and wherein at least one of said at least one analysis filter is a quadrature mirror filter analysis filter; and wherein at least one of said at least one synthesis filter is a quadrature mirror filter synthesis filter; and wherein at least one of said at least one quadrature mirror filter analysis filter comprises a first second order allpass filter and a second second order allpass filter, wherein said first second order allpass filter has a first transfer function $a_0(z)$ and said second second order allpass filter has a second transfer function $a_1(z)$, and wherein at least one of said at least one quadrature mirror filter synthesis filter comprises a third second order allpass filter and a fourth second order allpass filter, wherein said third second order allpass filter has said first transfer function $a_0(z)$ and said fourth second order allpass filter has said second transfer function $a_1(z)$, wherein said first second order allpass filter, said second second order allpass filter, said third second order allpass filter and said fourth second order allpass filter are polyphase components of $9^{th}$ order elliptic filters whose poles are on the imaginary axis.

21. The apparatus according to claim 11, wherein at least one of said at least one quadrature mirror filter analysis filter comprises a first second order allpass filter and a second second order allpass filter, wherein said first second order allpass filter has a first transfer function $a_0(z)$ and said second second order allpass filter has a second transfer function $a_1(z)$, and wherein at least one of said at least one quadrature mirror filter synthesis filter comprises a third second order allpass filter and a fourth second order allpass filter, wherein said third second order allpass filter has said first transfer function $a_0(z)$ and said fourth second order allpass filter has said second transfer function $a_1(z)$, wherein said first second order allpass filter, said second second order allpass filter, said third second order allpass filter and said fourth second order allpass filter are polyphase components of $9^{th}$ order elliptic filters whose poles are on the imaginary axis, and wherein said at least one of said at least one quadrature mirror filter analysis filter corresponds to said at least one of said at least one quadrature mirror filter synthesis filter via said non-symmetric tree structure; and wherein at least one of said at least one group delay module has the following transfer function:

$$T(z) = \frac{z^{-1} a_0(z^2) a_1(z^2)}{2}.$$

22. The apparatus according to claim 20, wherein the magnitude response of a low-frequency branch of said at least one of said at least one quadrature mirror filter analysis filter has a stopband edge frequency $f_{st,L} \approx 0.316 \cdot F_S$, and wherein the magnitude response of a high-frequency branch of said at least one of said at least one quadrature mirror filter analysis filter has a stopband edge frequency $f_{st,H} \approx 0.184 \cdot F_S$, wherein $F_S$ denotes the sampling rate associated with said at least one of said at least one quadrature mirror filter analysis filter; and wherein the magnitude response of a low-frequency branch of said at least one of said at least one quadrature mirror filter synthesis filter has a stopband edge frequency $f_{st,L} \approx 0.316 \cdot F_S$, and wherein the magnitude response of a high-frequency branch of said at least one of said at least one quadrature mirror filter synthesis filter has a stopband edge frequency $f_{st,H} \approx 0.184 \cdot F_S$, wherein $F_S$ denotes the sampling rate associated with said at least one of said at least one quadrature mirror filter synthesis filter.

23. The apparatus according to claim 20, wherein the magnitude response of a low-frequency branch of said at least one of said at least one quadrature mirror filter analysis filter has a stopband edge frequency $f_{st,L}$ relatively close to $F_S/4$, and wherein the magnitude response of a high- frequency branch of said at least one of said at least one quadrature mirror filter analysis filter has a stopband edge frequency $f_{st,H}$ relatively close to $F_S/4$, wherein $F_S$ denotes the sampling rate associated with said at least one of said at least one quadrature mirror filter analysis filter; and wherein the magnitude response of a low-frequency branch of said at least one of said at least one quadrature mirror filter synthesis filter has a stopband edge frequency $f_{st,L}$ relatively close to $F_S/4$, and wherein the magnitude response of a high-frequency branch of said at least one of said at least one quadrature mirror filter synthesis filter has a stopband edge frequency $f_{st,H}$ relatively close to $F_S/4$, wherein $F_S$ denotes the sampling rate associated with said at least one of said at least one quadrature mirror filter synthesis filter.

24. The apparatus according to claim 12, wherein said apparatus comprises a filter calculator for calculating the filter coefficients of said at least one finite impulse response filter by using a target equalizer magnitude response, and wherein said filter calculator is fed with said target equalizer magnitude response.

25. The apparatus according to claim 24, wherein a first finite impulse response filter of said at least one finite impulse response filter is associated with a first set of filter coefficients, wherein said first finite impulse response filter equalizes a first of said at least two downsampled subband signals; and wherein said filter calculator calculates said first set of filter coefficients by forming a linear phase frequency-domain representation according to a target subband magnitude transfer function, wherein said target subband magnitude transfer function is separated from said target equalizer magnitude response within a frequency band corresponding to said first subband signal, and wherein the inverse discrete fourier transformation of said linear phase frequency-domain representation is calculated in order to obtain said first set of filter coefficients.

26. An apparatus comprising:

a separator and downsampler for separating and downsampling a digital signal into at least two downsampled subband signals;

an equalizer for equalizing at least one of said at least two downsampled subband signals; and an upsampler and combiner for upsampling and combining said at least two downsampled subband signals into a digital output signal, wherein said separator and downsampler comprises N analysis filters with N≧1, wherein said analysis filters are arranged in a symmetrical tree structure; and wherein said upsampler and combiner comprise N synthesis filters, wherein said synthesis filters are arranged in a symmetrical tree structure corresponding to said symmetrical tree structure of said N analysis filters.

27. The apparatus according to claim 26, wherein at least one of said N analysis filters is a quadrature mirror filter analysis filter, and wherein at least one of said N synthesis filters is a quadrature mirror filter synthesis filter.

28. The apparatus according to claim 1, wherein said equalizer comprises at least one infinite impulse response filter.

29. A method comprising:

separating and downsampling a digital signal into at least two downsampled subband signals;

equalizing at least one of said at least two downsampled subband signals; and upsampling and combining said at least two downsampled subband signals into a digital output signal;

wherein said separating and downsampling comprises N times analysis filtering with N≧2, wherein said N times analysis filtering being performed according to a non-symmetrical tree structure; and wherein said upsampling and combining comprises N times synthesis filtering, wherein said N times synthesis filtering being performed according to a non-symmetrical tree structure according to said non-symmetrical tree structure of said N times analysis filtering.

30. The method according to claim 29, wherein said separating and downsampling comprises analysis filtering.

31. The method according to claim 30, wherein said analysis filtering comprises quadrature mirror filter analysis.

32. The method according to claim 29, wherein said upsampling and combining comprises synthesis filtering.

33. The method according to claim 32, wherein said synthesis filtering comprises quadrature mirror filter synthesis.

34. The method according to claim 29, wherein said digital signal is a digital audio signal.

35. The method according to claim 29, wherein said analysis filtering comprises quadrature mirror filter analysis, and wherein said synthesis filtering comprises quadrature mirror filter synthesis.

36. The method according to claim 29, wherein said method comprises delaying of at least one of said at least two downsampled subband signals.

37. The method according to claim 36, wherein said delaying comprises group delaying.

38. The method according to claim 29, wherein said method comprises delaying of at least one of said at least two downsampled subband signals, and wherein said delaying comprises group delaying, wherein said group delaying is performed to compensate different group delays caused by said non-symmetric tree structure of said N times analysis filtering and the corresponding non-symmetric tree structure of said N times synthesis filtering.

39. The method according to claim 38, wherein said analysis filtering comprises quadrature mirror filter analysis, and wherein said synthesis filtering comprises quadrature mirror filter synthesis.

40. The method according to claim 29, wherein said equalizing comprises finite impulse response filtering.

41. The method according to claim 40, wherein said finite impulse response filtering comprises linear-phase Finite Impulse filtering, and wherein the filter coefficients used for said linear-phase finite impulse response filtering are symmetric.

42. The method according to claim 31, wherein said quadrature mirror filter analysis comprises first or higher order allpass filtering.

43. The method according to claim 33, wherein said quadrature mirror filter synthesis comprises first or higher order allpass filtering.

44. The method according to claim 42, wherein said quadrature mirror filter analysis comprises a first quadrature mirror filter analysis, and wherein said first quadrature mirror filter analysis is associated with a sampling rate $F_S$, and wherein said first quadrature mirror filter analysis comprises allpass filtering for obtaining a stopband edge frequency $f_{st,L}$ relatively close to $F_S/4$ in the magnitude response of a low-frequency branch of said first quadrature mirror filter analysis and for obtaining a stopband edge frequency $f_{st,H}$ relatively close to $F_S/4$ in the magnitude response of a high-frequency branch of said first quadrature mirror filter analysis.

45. The method according to claim 42, wherein said quadrature mirror filter analysis comprises a first quadrature mirror filter analysis, and wherein said first quadrature mirror filter analysis is associated with a sampling rate $F_S$, wherein said first quadrature mirror filter synthesis comprises allpass filtering for obtaining a stopband edge frequency $f_{st,}$ $_{L}\approx 0.316\cdot F_S$ in the magnitude response of a low-frequency branch of said first quadrature mirror filter analysis and for obtaining a stopband edge frequency $f_{st,H}\approx 0.184\cdot F_S$ in the magnitude response of a high-frequency branch of said first quadrature mirror filter analysis.

46. The method according to claim 43, wherein said quadrature mirror filter synthesis comprises a first quadrature mirror filter synthesis, and wherein said first quadrature mirror filter synthesis is associated with a sampling rate $F_S$, and wherein said first quadrature mirror filter synthesis comprises allpass filtering for obtaining a stopband edge frequency $f_{st,L}$ relatively close to $F_S/4$ in the magnitude response of a low-frequency branch of said first quadrature mirror filter synthesis and for obtaining a stopband edge frequency $f_{st,H}$ relatively close to $F_S/4$ in the magnitude response of a high-frequency branch of said first quadrature mirror filter synthesis.

47. The method according to claim 43, wherein said quadrature mirror filter synthesis comprises a first quadrature mirror filter synthesis, and wherein said first quadrature mirror filter synthesis is associated with a sampling rate $F_S$, and wherein said first quadrature mirror filter synthesis comprises allpass filtering for obtaining a stopband edge frequency $f_{st,L}\approx 0.316\cdot F_S$ in the magnitude response of a low-frequency branch of said first quadrature mirror filter synthesis and for obtaining a stopband edge frequency $f_{st,H}\approx 0.184\cdot F_S$ in the magnitude response of a high-frequency branch of said first quadrature mirror filter synthesis.

48. The method according to claim 29, wherein said separating and downsampling comprises analysis filtering, and wherein said analysis filtering comprises quadrature mirror filter analysis, and wherein said upsampling and combining comprises synthesis filtering, and wherein said synthesis filtering comprises quadrature mirror filter synthesis; and wherein said quadrature mirror filter analysis comprises a first quadrature mirror filter analysis, wherein said first quadrature mirror filter analysis comprises a first second order allpass filtering and a second second order allpass filtering, wherein said first second order allpass filtering being performed by a first transfer function $a_0(z)$, and wherein said second second order allpass filtering being performed by a second transfer function $a_1(z)$; and wherein said quadrature mirror filter synthesis comprises a first quadrature mirror filter synthesis, wherein said first quadrature mirror filter synthesis comprises a third second order allpass filtering and a fourth second order allpass filtering, wherein said third second order allpass filtering being performed by said first transfer function $a_0(z)$, and wherein said fourth second order allpass filtering being performed by said second transfer function $a_1(z)$ ; and wherein said transfer functions $a_0(z)$ and $a_1(z)$ represent second order allpass filters with polyphase components of $9^{th}$ order elliptic filters whose poles are on the imaginary axis.

49. The method according to claim 39, wherein said quadrature mirror filter analysis comprises a first quadrature mirror filter analysis, wherein said first quadrature mirror filter analysis comprises a first second order allpass filtering and a second second order allpass filtering, wherein said first second order allpass filtering being performed by a first transfer function $a_0(z)$, and wherein said second second order allpass filtering being performed by a second transfer function $a_1(z)$; and wherein said quadrature mirror filter synthesis comprises a first quadrature mirror filter synthesis, wherein said first quadrature mirror filter synthesis comprises a third second order allpass filtering and a fourth second order allpass filtering, wherein said third second order allpass filtering being performed by said first transfer function $a_0(z)$, and wherein said fourth second order allpass filtering being performed by a second transfer function $a_1(z)$ ; and wherein said transfer functions $a_0(z)$ and $a_1(z)$ represent second order allpass filters with polyphase components of $9^{th}$ order elliptic filters whose poles are on the imaginary axis; and wherein said first quadrature mirror filter analysis corresponds to said first quadrature mirror filter synthesis via said non-symmetric tree structure; and wherein said group delaying is performed by filtering, wherein said filtering corresponds to the following transfer function:

$$T(z) = \frac{z^{-1}a_0(z^2)a_1(z^2)}{2}.$$

50. The method according to claim 49, wherein said first quadrature mirror filter analysis is associated with a sampling rate $F_S$, and wherein the magnitude response of a low-frequency branch of said first quadrature mirror filter analysis has a stopband edge frequency $f_{st,L}\approx 0.316\cdot F_S$ , and wherein the magnitude response of a high-frequency branch of said first quadrature mirror filter analysis has a stopband edge frequency $F_S$; and wherein said first quadrature mirror filter synthesis is associated with a sampling rate $F_S$, wherein the magnitude response of a low-frequency branch of said first quadrature mirror filter synthesis has a stopband edge frequency $f_{st,L}\approx 0.316\cdot F_S$ , and wherein the magnitude response of a high-frequency branch of said first quadrature mirror filter analysis has a stopband edge frequency $f_{st,H}\approx 0.184\cdot F_S$.

51. The method according to claim 49, wherein said first quadrature mirror filter analysis is associated with a sampling rate $F_S$, wherein the magnitude response of a low-frequency branch of said first quadrature mirror filter analysis has a stopband edge frequency $f_{st,L}$ close to $F_S/4$ , and wherein the magnitude response of a high-frequency branch of said first quadrature mirror filter analysis has a stopband edge frequency $f_{st,H}$ close to $F_S/4$ ; and wherein said first quadrature mirror filter synthesis is associated with a sampling rate $F_S$, wherein the magnitude response of a low-frequency branch of said first quadrature mirror filter synthesis has a stopband edge frequency $f_{st,L}$ close to $F_S/4$ , and wherein the magnitude response of a high-frequency branch of said first quadrature mirror filter synthesis has a stopband edge frequency $f_{st,H}$ close to $F_S/4$.

52. A method comprising:

separating and downsampling a digital signal into at least two downsampled subband signals;

equalizing at least one of said at least two downsampled subband signals; and upsampling and combining said at least two downsampled subband signals into a digital output signal;

wherein said separating and downsampling comprises N times analysis filtering with $N\geqq 1$, wherein said N times analysis filtering being performed according to a symmetrical tree structure; and wherein said upsampling and combining comprises N times synthesis filtering, wherein said N times synthesis filtering being performed according to a symmetrical tree structure according to said symmetrical tree structure of said N times analysis filtering.

53. The method according to claim 52, wherein said analysis filtering comprises quadrature mirror filter analysis, and wherein said synthesis filtering comprises quadrature mirror filter synthesis.

54. The method according to claim 40, wherein said finite impulse response filtering comprises a first finite impulse response filtering associated with a first set of filter coefficients, wherein said first finite impulse response filtering equalizes a first subband signal of said at least two downsampled subband signals, wherein a linear phase frequency-domain representation is formed according to a target subband magnitude transfer function, wherein said target subband magnitude transfer function is separated from a target equalizer magnitude response within a frequency band corresponding to said first subband signal, and wherein the inverse discrete fourier transformation of said linear phase frequency-domain representation is calculated in order to obtain said first set of filter coefficients.

55. The method according to claim 40, wherein said finite impulse response filtering comprises a first finite impulse response filtering associated with a first set of filter coefficients, wherein said first finite impulse response filtering equalizes a first of said at least two downsampled subband signals, wherein a linear phase frequency-domain representation is formed according to a target subband magnitude transfer function, wherein said target subband magnitude transfer function is separated from a target equalizer magnitude response within a frequency band corresponding to said first subband signal, and wherein the Remez filter design algorithm is applied to said linear phase frequency-domain representation in order to calculate said first set of filter coefficients.

56. The method according to claim 54, wherein said target equalizer magnitude response is separated into n subbands in the frequency domain with $n \geqq 2$.

57. The method according to claim 56, wherein said separating and downsampling comprises analysis filtering, and wherein said analysis filtering comprises quadrature mirror filter analysis, and wherein said upsampling and combining comprises synthesis filtering, and wherein said synthesis filtering comprises quadrature mirror filter synthesis; and wherein said first quadrature mirror filter synthesis corresponds to said first quadrature mirror filter synthesis; and wherein said first quadrature mirror filter analysis and said first quadrature mirror filter synthesis are associated with a sampling rate $F_S$, and wherein the magnitude response of a low frequency branch of said quadrature mirror filter analysis and synthesis has a stopband edge frequency $f_{st,L} \geqq F_S/4$, and wherein the magnitude response of a high frequency branch of said quadrature mirror filter analysis and synthesis has the stopband edge frequency $f_{st,H} \leqq F_S/4$; and wherein said target equalizer magnitude response is constant in the frequency region between $f_{st,H}$ and $f_{st,L}$.

58. The method according to claim 57, wherein said n subbands of said target equalizer magnitude response correspond to n−1 crossover frequencies, and wherein said n−1 crossover frequencies are arranged so that none of said n−1 crossover frequencies lies in said frequency region between $f_{st,H}$ and $f_{st,L}$.

59. The method according to claim 58, wherein said n subbands of said target equalizer magnitude response are distributed logarithmically.

60. The method according to claim 29, wherein said equalizing comprises finite impulse response filtering.

61. A computer program product for equalizing a digital signal comprising program code stored on a non-transitory computer readable medium for execution by a processor, such that when executed said program code:

separates and downsamples said digital signal into at least two downsampled subband signals; and equalizes at least one of said at least two downsampled subband signals; and upsamples and combines said at least two downsampled subband signals into a digital output signal;

wherein said separating and downsampling comprises N times analysis filtering with $N \geqq 2$, wherein said N times analysis filtering being performed according to a non-symmetrical tree structure; and wherein said upsampling and combining comprises N times synthesis filtering, wherein said N times synthesis filtering being performed according to a non-symmetrical tree structure according to said non-symmetrical tree structure of said N times analysis filtering.

62. An audio device comprising an apparatus according to claim 1.

63. The audio device according to claim 62, wherein said equalizer comprises at least one finite impulse response filter; and wherein said audio device comprises a filter calculator for calculating the filter coefficients of said at least one finite impulse response filter by using a target equalizer magnitude response, wherein said audio device comprises a user interface in order to obtain said target equalizer magnitude response, wherein said user interface is connectable to said filter calculator to transmit said target equalizer magnitude response to said filter calculator.

64. The audio device according to claim 62, wherein said equalizer comprises at least one infinite impulse response filter; and wherein said audio device comprises a filter calculator for calculating the filter coefficients of said at least one infinite impulse response filter by using a target equalizer magnitude response, wherein said audio device comprises a user interface in order to obtain said target equalizer magnitude response, wherein said user interface is connectable to said filter calculator to transmit said target equalizer magnitude response to said filter calculator.

65. An apparatus comprising:

means for separating and downsampling said digital signal into at least two downsampled subband signals;

means for equalizing at least one of said at least two downsampled subband signals; and means for upsampling and combining said at least two downsampled subband signals into a digital output signal:

wherein said means for separating and downsampling comprises N means for analysis filtering with $N \geqq 2$, wherein said means for analysis flittering are arranged in a non-symmetrical tree structure; and wherein said means for upsampling and combining comprises N means for synthesis filtering, wherein said means for synthesis filtering are arranged in a non-symmetrical tree structure corresponding to said non-symmetrical tree structure of said N analysis filters.

66. The apparatus according to claim 65, wherein said separator and downsampler comprises at least one analysis filter.

67. A computer program product for equalizing a digital signal comprising program code stored on a non-transitory computer readable medium for execution by a processor, such that when executed said program code:

separates and downsamples said digital signal into at least two downsampled subband signals; and equalizes at least one of said at least two downsampled subband signals; and upsamples and combines said at least two downsampled subband signals into a digital output signal;

wherein said separating and downsampling comprises N times analysis filtering with N≧1, wherein said N times analysis filtering being performed according to a symmetrical tree structure; and wherein said upsampling and combining comprises N times synthesis filtering, wherein said N times synthesis filtering being performed according to a symmetrical tree structure according to said symmetrical tree structure of said N times analysis filtering.

68. An audio device comprising an apparatus according to claim 26.

69. An apparatus comprising:

means for separating and downsampling said digital signal into at least two downsampled subband signals;

means for equalizing at least one of said at least two downsampled subband signals; and means for upsampling and combining said at least two downsampled subband signals into a digital output signal:

wherein said means for separating and downsampling comprises N means for analysis filtering with N≧1, wherein said means for analysis flittering are arranged in a symmetrical tree structure; and wherein said means for upsampling and combining comprises N means for synthesis filtering, wherein said means for synthesis filtering are arranged in a symmetrical tree structure corresponding to said non-symmetrical tree structure of said N analysis filters.

* * * * *